(12) United States Patent
Rishi et al.

(10) Patent No.: US 11,925,173 B2
(45) Date of Patent: Mar. 12, 2024

(54) DATA COLLECTION SYSTEM AND METHOD FOR FEEDING AQUATIC ANIMALS

(71) Applicant: OBSERVE TECHNOLOGIES LIMITED, Richmond (GB)

(72) Inventors: Hemang Ravi Rishi, Richmond (GB); Pieter Jan Fabry, London (GB); Ivan Makeev, London (GB); Charchris Sloan, London (GB)

(73) Assignee: Observe Technologies Limited, Richmond Greater London (GB)

( * ) Notice: Subject to any disclaimer, the term of this patent is extended or adjusted under 35 U.S.C. 154(b) by 895 days.

(21) Appl. No.: 16/627,203

(22) PCT Filed: Jun. 28, 2018

(86) PCT No.: PCT/GB2018/051824
§ 371 (c)(1),
(2) Date: Dec. 27, 2019

(87) PCT Pub. No.: WO2019/002880
PCT Pub. Date: Jan. 3, 2019

(65) Prior Publication Data
US 2020/0113158 A1    Apr. 16, 2020

(30) Foreign Application Priority Data

Jun. 28, 2017 (GB) ..................................... 1710372

(51) Int. Cl.
*G06T 7/20* (2017.01)
*A01K 61/10* (2017.01)
(Continued)

(52) U.S. Cl.
CPC .............. *A01K 61/80* (2017.01); *A01K 61/10* (2017.01); *A01K 61/13* (2017.01); *A01K 61/60* (2017.01);
(Continued)

(58) Field of Classification Search
CPC ........ A01K 61/80; A01K 61/60; A01K 61/13; G06N 20/00; G06N 3/04; G06V 40/20; G06T 7/20
See application file for complete search history.

(56) References Cited

U.S. PATENT DOCUMENTS

| 5,732,655 A | 3/1998 | Bab et al. |
| 5,961,831 A | 10/1999 | Lee et al. |

(Continued)

FOREIGN PATENT DOCUMENTS

| CN | 105511346 A | 4/2016 |
| CN | 106407711 A | 2/2017 |

(Continued)

OTHER PUBLICATIONS

International Search Report and Written Opinion received for PCT Application No. PCT/GB2018/051824, dated Sep. 21, 2018. 15 pages.

(Continued)

*Primary Examiner* — Sam Bhattacharya
(74) *Attorney, Agent, or Firm* — Finch & Maloney PLLC

(57) ABSTRACT

The present invention relates to a method and apparatus for collecting and/or pre-processing data related to feeding animals in water. More particularly, the present invention relates to a method and apparatus for minimising wasted feed used in a fish farm. According to an aspect, there is a provided a computer-implemented method for detecting motion in relation to one or more aquatic animals, the method comprising the steps of: receiving sensor data;

(Continued)

determining from the sensor data one or more moving objects using one or more learned functions; and generating output data in relation to the determined one or more moving objects.

25 Claims, 10 Drawing Sheets

(51) Int. Cl.
*A01K 61/13* (2017.01)
*A01K 61/60* (2017.01)
*A01K 61/80* (2017.01)
*G06F 18/21* (2023.01)
*G06N 3/04* (2023.01)
*G06N 3/08* (2023.01)
*G06N 20/00* (2019.01)
*G06V 40/20* (2022.01)

(52) U.S. Cl.
CPC ............ *G06F 18/217* (2023.01); *G06N 3/04* (2013.01); *G06N 3/08* (2013.01); *G06N 20/00* (2019.01); *G06T 7/20* (2013.01); *G06V 40/20* (2022.01); *G06T 2207/10016* (2013.01); *G06T 2207/20081* (2013.01); *G06T 2207/20084* (2013.01)

(56) References Cited

U.S. PATENT DOCUMENTS

| | | | |
|---|---|---|---|
| 6,000,362 | A | 12/1999 | Blyth et al. |
| 6,510,815 | B1 | 1/2003 | Lagardere |
| 9,924,700 | B1 | 3/2018 | Kuper et al. |
| 10,653,110 | B2 | 5/2020 | Pfeiff |
| 2013/0206078 | A1 | 8/2013 | Melberg et al. |
| 2017/0225330 | A1* | 8/2017 | Wagner .................. B25J 9/1697 |
| 2020/0170227 | A1 | 6/2020 | Rishi et al. |

FOREIGN PATENT DOCUMENTS

| | | |
|---|---|---|
| CN | 108575788 A | 9/2018 |
| DE | 4224750 A1 | 2/1994 |
| DE | 102016114137 B3 | 8/2017 |
| EP | 2178362 A1 | 4/2010 |
| EP | 2923567 A1 | 9/2015 |
| JP | 2019153302 A | 9/2019 |
| SE | 9804384 | 6/2000 |
| WO | 9749279 A1 | 12/1997 |
| WO | 0003586 | 1/2000 |
| WO | 2009008733 A1 | 1/2009 |
| WO | 2011089007 A2 | 7/2011 |
| WO | 2012083461 A1 | 6/2012 |
| WO | 2016023071 A1 | 2/2016 |
| WO | 2016056923 A1 | 4/2016 |
| WO | 2016181604 A1 | 11/2016 |
| WO | 2017119821 A1 | 7/2017 |
| WO | 2017132690 A1 | 8/2017 |
| WO | 2017197129 A1 | 11/2017 |
| WO | 2019002880 A1 | 1/2019 |
| WO | 2019002881 A1 | 1/2019 |

OTHER PUBLICATIONS

International Preliminary Report on Patentability received for PCT Application No. PCT/GB2018/051824, dated Sep. 13, 2019, 10 pages.
European Examination Report pursuant to Article 94(3) received for EP Application No. 18739604.9, dated Jan. 19, 2022. 6 pages.
International Search Report and Written Opinion received for PCT Application No. PCT/GB2018/051825, dated Sep. 21, 2018. 12 pages.
International Preliminary Report on Patentability received for PCT Application No. PCT/GB2018/051825, dated Sep. 13, 2019, 10 pages.
Isokawa, et al., "TalkingNemo: Aquarium Fish Talks Its Mind for Breeding Support," ACM, 2016, 4 pages.
Zion, Boaz, "The use of computer vision technologies in aquaculture—A review," Elsevier Computers and Electronics in Agriculture 88 (2012), pp. 125-132.

* cited by examiner

DATA COLLECTION SYSTEM AND METHOD FOR FEEDING AQUATIC ANIMALS

FIELD

The present invention relates to a method and apparatus for collecting and/or pre-processing data related to feeding animals in water. More particularly, the present invention relates to a method and apparatus for minimising wasted feed used in a fish farm.

BACKGROUND

Now that most wild capture fisheries are at or even above sustainable levels, interest in aquaculture, or fish farming, is increasing. Despite rapid expansion in recent decades, aquaculture is still expected to grow by nearly 40% by 2025. However, in many cases the most suitable sites for fish farms have already been utilised so further expansion cannot be met simply by opening more farms.

Fish farming ideally requires fish to be fed the optimum amount of food, so for example at the optimal times and providing the optimal amounts. Fish at typically fed with food pellets that are dropped into the enclosed areas in which each shoal of fish are farmed. It is probably not possible to identify the absolutely ideal optimal values; for example, for the times between feeds, duration of feeding and amount of pellets to be provided during each feed; but it is desired to get as close to these optimal values as possible.

Feeding the fish too regularly, feeding the fish too many pellets during a feed, or feeding the fish for too long a duration, or even feeding the fish at the wrong time(s) of day will result in wasted pellets. Wasted pellets result in food collecting underneath the fish and potentially attracting undesirable algae or other marine life and/or changing the properties of the surrounding ocean. Wasted pellets also result in a less commercially efficient fish farming operation.

Thus, it is desired to avoid wasting pellets when operating a fish farm.

It has been attempted to measure the amount of wasted pellets, but current methods are unreliable and/or require impractical, expensive and thus commercial prohibitive equipment.

It has also been attempted to measure fish activity in order to determine whether it is an appropriate time to feed fish, but again current methods are unreliable and/or require impractical, expensive and thus commercial prohibitive equipment.

Consequently, there is a need to improve the efficiency of fish farming.

SUMMARY OF INVENTION

Aspects and/or embodiments seek to provide a method of collecting and/or pre-processing data related to feeding animals in water. More particularly, the present invention relates to a method and apparatus for minimising wasted feed used in a fish farm.

According to a first aspect, there is provided a computer-implemented method for detecting motion in relation to one or more aquatic animals, the method comprising the steps of: receiving sensor data; determining from the sensor data one or more moving objects using one or more learned functions; and generating output data in relation to the determined one or more moving objects.

To help ensure the profitability of raising animals for a farmer, particularly in relation to farmed fish, it can be important to minimise feed wastage. Wasted feed does not contribute to the growth of the fish, which is ultimately why fish are conventionally farmed.

Optionally, the one or more moving objects comprises any or any combination of: feed; feed pellets; faeces; aquatic animals; groups of aquatic animals. Optionally, the sensor data is obtained from one or more enclosed spaces containing water; optionally the one or more enclosed spaces comprise one or more cages and/or one or more aquatic animal farms.

Depending on farmer preference or feeding determined automatically, it may be substantially more optimal in terms of feeding aquatic animals to analyse different areas in one or more cages collectively in substantially real time.

Optionally, the sensor data comprises any or any combination of: image data; a plurality of image frames; video data; acoustic data; sonar data; light data; biomass data; environmental data; stereo vision data; acoustic camera data; and/or fish activity data: optionally said sensor data comprises any or a combination of: fish type; feed type; past and present feed conversion ratio; biological feed conversion ratio; economical feed conversion ratio; past and present standard growth rate; past and present specific growth rate; mortality data; feed input data comprising amount and/or rate and/or intensity; optionally said fish activity data comprises any or a combination of: reaction of fish towards feed; fish schooling data; surface feeding activity; fish density; fish speed; and/or distance of fish from sensors; optionally said environmental data comprises any or a combination of: dissolved oxygen level; state of the tide; pH of the water; visibility through the water; intensity of light incident on the water; biomass data; mass of feed being consumed; air and/or water temperature; sunlight; cleanliness of water; salinity; saturation; rainfall; tide level; state of nets; treatments; sea lice count; oxygen input data; current or wind data; fish genetic data; and/or fish vaccination. Optionally, the sensor data is substantially real time sensor data; optionally further comprising the step of storing the sensor data for later analysis, optionally the sensor data is stored in a cloud and/or further optionally the sensor data is further processed in the cloud.

Such data can be useful in generating an accurate model regarding the optimum amount of feed to provide to the fish. For example, when dissolved oxygen is low, food is liable to metabolize poorly. Higher temperatures may lead to faster growth rates and sunlight may affect the rate of fish maturity.

Optionally, the sensor data is provided by any or any combination of: a still image camera; a video camera; a pan-tilt-zoom camera; a fixed colour camera; a fixed black and white camera; and/or a high-resolution camera; and optionally the method further comprises a step of: adjusting a camera prior to at least one of the steps of receiving the sensor data.

Such a camera can be arranged to provide a wide viewing angle, with the ability to focus on a particular area of a fish enclosure. It may be advantageous for a farmer to be aware of a certain area within a cage, for example in the case of a hole allowing for predators to enter, or on a part of a school of fish which seems unhealthy. Such adjustments to the camera may also allow processing to occur in real time.

Optionally, the one or more learned functions comprise any or a combination of: one or more neural networks; one or more convolutional neural networks (CNNs); one or more deep learning functions and/or models; one or more CNNS comprising one or more architectural models such as Res- Net, InseptionNet and/or SqueezeNet; Long Short Term Memory (LSTM) neural networks; Recurrent neural networks (RNN); or Gated Recurrent Unit (GRU); optionally the sensor data is input into said one or more learned functions; and/or optionally the one or more learned functions are updated over a time period and/or using reinforcement learning techniques and/or are arranged to continuously learn in real time. Optionally, motion of the one or more moving objects is monitored over all or a sequential portion of said sensor data; optionally any localization and/or tracking of the aquatic animals is performed through the use of one or more CNN; optionally an activity level is monitored over a plurality of individual image frames.

Neural networks are computing systems which can be arranged to progressively improve their performance in relation to specific tasks through the use of training. Such training may be provided through labelled examples, or manual correction of the neural network when necessary. Neural networks are conventionally arranged from one or more layers of nodes, wherein each layer is set up to perform a specific role in the overall task to be performed. In this embodiment, a task to be performed may be defining images obtained through real time image data as either "feed" or "not feed", thereby detecting when feed is not being consumed by the fish. The model which is assembled can then provide an efficient feeding schedule and/or quantity of feed in order to minimise waste while still maximising growth rate of the fish. CNNs such as CLSTM or CRNN, and/or recurrent designs such as LSTM or RNN, can be particularly efficient at classifying, processing, and predicting data points which have been indexed in time order. Broadly, temporal information may be processed through a feedback loop in the state of individual layers, nodes, or overall networks.

Also, by dynamically updating the model over a time period, for example 10 individual feeding cycles, a more accurate model may be developed by incorporating new learned information and hence less feed may be wasted in the future.

Optionally, an activity level of one or more aquatic animals is determined by the one or more learned functions; optionally the sensor data is labelled to extract features which optimise feeding; and/or optionally the activity level is labelled within a range between low to high; and/or the activity level of one or more aquatic animals comprises speed, schooling behaviour, movement and/or distance from a sensor.

Optionally, feeding data is determined by the one or more learned functions; optionally the feeding data comprises any or any combination of: detected feed pellets; wasted feed pellets; faeces; and/or the step of determining the one or more moving objects comprises distinguishing between feed and waste; and/or determining the one or more moving objects comprises feed pellets at a depth below that at which the one or more aquatic animals normally feed; and/or optionally feeding data comprises a determination of a proportion of the feed not consumed by the animals by distinguishing between feed pellets and waste products of the animals in the sensor data.

To help ensure the profitability of raising animals for a farmer, particularly in relation to farmed fish, it can be important to minimise feed wastage. Wasted feed does not contribute to the growth of the fish, which detriments one of the ultimate goals of farming fish. Wasted feed may also collect underneath the fish being farmed. The wasted feed that has collected can then decay, encouraging undesirable microbial growth, smothering existing marine ecosystems, and depriving local volumes of water of the oxygen required for the fish to remain healthy. Any chemicals or antibiotics in the feed which settle on the ground may leak into the ecosystem, and cause undesirable effects including tumours, lesions and parasites in aquatic animals local to the fish farm. Therefore, it is desirable to minimise the amount of feed wasted by providing as close to the precise amount of feed required to encourage optimal growth of the fish. Any excess feed is liable to pass uneaten through the fish feeding area and be wasted. A "loss" function can be an efficient way to optimise a particular goal, for example reducing the overall cost of feed and decreasing the feed conversion ratio. The feed conversion ratio (FCR) refers to the amount of feed inputted as kg to the growth in fish in kg. In an example, distinguishing feed from waste in order to reach an optimal level of FCR may be performed by detecting feed pellets at a depth below that at which the animals normally feed.

Optionally, data regarding the one or more aquatic animals is determined; said data comprising one or more of: feeding pellets not consumed; feed conversion rate; biomass; animal mortality; animal growth; instructing placement of a derived amount of feed; and/or animal activity; optionally, in response to determining said data there is performed the step of triggering an alarm in response to any or any combination of: the feeding process being wrong, detected levels of dissolved oxygen dropping, the presence of other species of animal in the enclosed space, detected health anomalies, and/or detected net holes.

The feeding process being wrong and the presence of other species of animal in the confined space (for example, sharks or jellyfish), can significantly damage the fish on a fish farm. Such damage may be in the form of physical attacks to the fish themselves or may reduce the level of dissolved oxygen in the water. Therefore, it can be advantageous for a farmer to be informed of such events as soon as possible, for example through the use of an alarm system, in order to mitigate the negative effects. Any alarms (also referred to as alerts) may be stored in a cloud server or locally, and may, for example, provide information relating to feeding patterns and graphs of previously supplied recommendations to maximise efficient running of farms in the future. Information may also be stored and provided in relation to actions that a farmer took, which can be advantageous to management-level employees when running a fish farm. Such data storage, retrieval, and supply for future use may be applied to any data recorded or created via processing through the use of the apparatus or method or system disclosed herein. The detection process of such other species may be arranged to identify any species which is not the species of animal being farmed.

Optionally, the output in relation to the determined one or more moving objects is generated through correlation analysis of the sensor data comprising one or more analysis in relation to any or any combination of: feed provided to the one or more aquatic animals; activity level of the one or more aquatic animals; wasted feed pellets; and/or environmental data.

Optionally, the correlation analysis is performed using a feedback loop: optionally the feedback loop comprises a circular buffer and/or a state buffer.

Circular buffers are capable of increasing the speed of within the neural network by storing states over a buffer and implements a feedback loop. In some embodiments, a state buffer may be implemented as a fixed-size queue with explicit shift/append operations and temporal information may be any of RNN, LSTM, or GRUs etc. In training AI, the state buffer may be stored between training steps within a temporal batch which allows to avoid explicit unrolling or unfolding as they may be used in conventional RNNs. The temporal or inter-frame recurrence via a state buffer may be combined with a multi-tasking or intra-frame recurrence.

Optionally, an optimised level of feed is determined by using the feedback loop optimising for one or more variables; optionally the one or more variables comprises any one or more of growth rate to feed conversion ratio, minimal pellet loss, and/or sea lice.

Optionally, one or more signal processing techniques is used to build the feedback loop. Optionally, the correlation analysis determines one or more features of the system. Further optionally the correlation analysis determines the one or more features of the system using linear regression, polynomial regression and/or random forests. Optionally, determining the one or more features of the system comprises a step of correlating one or more signals to the one or more features; optionally the step of correlating the one or more signals to the one or more features comprises multi-task learning and/or further optionally the step of correlating the one or more signals to the one or more features comprises converging the one or more signals to the one or more features.

Optionally, the optimised level of feed is generated through the use of one or more neural networks to form a model; optionally the one or more neural networks is implemented on a graphical processing unit (GPU); further optionally the one or more neural networks is implemented in vectorized computer processing unit (CPU) instructions: optionally the vectorized CPU instructions comprises SIMD; optionally the one or more neural networks comprise one or more convolutional neural networks (CNNs); optionally the one or more CNNs comprises any one or more architectural models such as ResNet, InseptionNet, and/or SqueezeNet; and optionally the model is trained and formed to: analyse real time image data to perform feed detection and localisation; analyse previous image frames to identify movement and/or warping of pellets relative to current real time image data frames; and enhance the distinction of feed and waste for future image frames; and further optionally localization is performed using one or more blob detectors; and still further optionally the one or more neural networks uses one or more feedback loops to provide temporal information: optionally the one or more neural networks comprises any of: Long Short Term Memory (LSTM) neural networks; Recurrent neural networks (RNN); Gated Recurrent Unit (GRU); internal state machines; and/or circular buffers; and further optionally the one or more neural networks is used to create a feature set from the sensor data by correlating two or more feature signals obtained from the sensor data.

Neural networks are computing systems which can be arranged to progressively improve their performance in relation to specific tasks through the use of training. Such training may be provided through labelled examples, or manual correction of the neural network when necessary. Neural networks are conventionally arranged from one or more layers of nodes, wherein each layer is set up to perform a specific role in the overall task to be performed. In this embodiment, a task to be performed may be defining images obtained through real time image data as either "feed" or "not feed", thereby detecting when feed is not being consumed by the fish. The model which is assembled can then provide an efficient feeding schedule and/or quantity of feed in order to minimise waste while still maximising growth rate of the fish. CNNs such as LSTM or RNN can be particularly efficient at classifying, processing, and predicting data points which have been indexed in time order. Broadly, temporal information may be processed through a feedback loop in the state of individual layers, nodes, or overall networks.

Optionally, the sensor data is provided via the web for optional online/offline storage and analysis: optionally the real time image data is in a real time streaming protocol (RTSP)/a real time messaging protocol (RTMP); optionally wherein the sensor data is in a real time messaging protocol (RTMP)/a real time transport protocol (RTP)/a hypertext transfer protocol (HTTP); and/or further optionally wherein the RSTP/RTMP/RTP/HTTP comprises a H264/VP8/VP9/H265 format.

Offline processing may be performed to improve an algorithm that performs the step of deriving the amount of food required, and hence reduce feed wastage in the future. This processing may occur offsite or locally, for example at night when no feeding is taking place. Deep learning is a form of machine learning which can be very efficient for feature extraction from one or more images. There may be provided a plurality of layers of nonlinear processing units, wherein each successive layer uses as its input and output from the previous layer. Further, if the farm is in a remote location, and may lack a reliable connection to an off-site computer processing facility, it may be more efficient and/or reliable to perform the computer-implemented steps locally.

Optionally, the sensor data comprises a plurality of substantially real time sensor data streams that are received individually and/or simultaneously; optionally the plurality of substantially real time sensor data streams are learned simultaneously using multi-task learning; further optionally the multi-task learning is implemented for simultaneous detection, motion estimation, feed/waste classification and/or characteristic regressions; and/or bounding box regression; and/or further optionally the plurality of real time sensor data streams are mapped in real time. Optionally, the sensor data is mapped on any one or more of: probability maps; heat maps; motion maps; flow maps; and/or unified maps; optionally the sensor data is mapped in relation to feed and/or waste, and/or further optionally the sensor data is mapped as an optical flow.

Outputs may be provided in the form of one or more probability maps/heat maps/motion maps relating to feed and waste individually or together. A form of blob detector, may be used in order to localise pellets/waste in respective probability map(s). However, in some embodiments localisation of elements may be carried out using a bounding box regression. In order to speed up the process of blob detection, the local maximum probability below a certain threshold can be customised. Motion vectors of images are analysed in the internal facility creating 2D velocity vectors (x,y). Heat map vectors that mimic optical flow produces temporal data which can enhance the system's ability to classify objects based on how different objects fall within the cage.

Optionally, the method further comprises a step of determining feed to be provided to the one or more aquatic animals; optionally the step of determining feed comprises any one or more of: determining whether to increase/decrease the amount of feed; determining whether to continue/cease feeding; determining an area feed is to be provided; and or determining whether to start/stop providing feed to the one or more aquatic animals.

Optionally, the output data in relation to the determined one or more moving objects is provided to one or more learned decision-making models.

According to a second aspect, there is provided a computer-implemented method for feeding animals in an enclosed space containing water, the method comprising the steps of: receiving first real time image data from the confined space during a first time period; determining, from at least the real time image data, an activity level for the animals prior to and/or during feeding; deriving an amount of feed required in response, at least to the activity level; instructing placement of the derived amount of feed in the confined space; receiving second real time image data from the confined space during a second time period, determining, from at least the second real time image data, what proportion of the feed is not consumed by the animals and/or an activity response of the animals to the feed; receiving third real time image data from the enclosed space during a third time period; calculating a degree of satiety of the animals from at least the third real time image data, and storing at least a portion of the data in respect of at least one of the time periods.

The three time periods may be defined as follows:
1) BEFORE. The "before" activity may comprise data relating to activity of fish during their anticipation of feed, before the feed has actually been provided.
2) DURING. During feeding the activity may be heavily weighted when a Learned model (also referred to as just a "model") is being developed. The presence of feed pellets can be detected and measured during this time, to provide a recommendation for reducing, maintaining, or increasing the volume of feed. The behaviours of the fish may also be more accurately understood, particularly with regard to their activity during the feeding process.
3) AFTER. The detection of pellets (or lack thereof) and the activity of the fish as a reaction may cause the recommendation of feed for the following feeding session to be adjusted.

Processing visual data from video cameras in the fish cages can form an important part of the feed analysis process. The processing may occur locally or in the cloud. However, many fish farms are in isolated areas with poor network connectivity, and so in such cases local processing would be required.

In arrangements where at least two of the first, second and third steps of receiving real time image data are performed simultaneously for the confined space can provide a quicker processing of the real time image data, and hence feedback useful information to a farmer more quickly. Any feed suggestions may then be implemented as soon as possible to maximise efficiency of feeding.

According to a third aspect, there is provided an apparatus operable to perform the method of any preceding claim; optionally the one or more learned functions are substantially implemented on a graphical processing unit; and/or and/or optionally the one or more learned functions are substantially implemented using vectorized CPU instructions, optionally wherein the vectorised CUP instructions comprise SSE4 instructions; optionally the method is performed substantially locally to where the aquatic animals are located; further optionally the method is updated and/or improved in the cloud. and/or optionally the apparatus comprises any or any combination of: an input; a memory; a processor; and an output.

Such an apparatus can provide the advantages described herein in relation to the computer-implemented method of feeding animals in a confined space containing water. The method can also be performed using vectorized CPU instructions such as SSE4 instructions.

According to a fourth aspect, there is provided a system operable to perform the method of any preceding claim; optionally the system provides a user interface; optionally the user interface is operable to display any or any combination of: feed pellets not consumed by the one or more aquatic animals; a derived amount of feed; a rate at which feed should be provided; feeding pellets not consumed; feed conversion rate; biomass; animal mortality; animal growth; instructing placement of a derived amount of feed; and/or animal activity; further optionally the user interface is operable to display an alarm in response to any or any combination of: the feeding process being wrong, detected levels of dissolved oxygen dropping, the presence of other species of animal in the enclosed space, detected health anomalies, and/or detected net holes; and/or optionally the system is operable to instruct placement of feed by signalling to feed distribution apparatus.

Farmers may have more than one confined space comprising fish being farmed, and so it can be advantageous to monitor more than one confined space simultaneously. A user interface, for example in the form of a dynamic bar, can provide useful information to farmers in a more convenient manner. Pictures may be provided as evidence to a farmer as to why certain conclusions were reached and/or why certain decisions were recommended. The farmer may then be able to act more effectively and efficiently when managing the farm. Data, for example regarding negatively impactful feeding patterns and interpretation of the results of analysis from CNNs and/or a function F(x) modelled by amalgamating sensor data from CNNs, LSTMS and/or raw sensor values, may be transmitted to a farmer or manager. Such transmission may be via the Internet, and can provide useful information regarding future decisions to be made. Signalling directly to a feed distribution apparatus can provide a level of automation to the farm, feed can be provided automatically where it is required.

According to a fifth aspect, there is provided a computer program product operable to perform the method and/or apparatus and/or system of any preceding claim.

According to a further aspect, there is provided a computer-implemented method for feeding one or more aquatic animals, the method comprising the steps of: receiving real time sensor data;

determining from the real time sensor data an amount of wasted feed using one or more learned functions; and generating an output when a predetermined level of wasted feed is determined.

Optionally, the method comprises the step of: deriving from the real time sensor data an amount of feed provided to the one or more aquatic animals using deep learning. Optionally, the real time sensor data comprises any one or more of: real time image data; acoustic data; sonar data; light data; biomass data; and/or environmental data.

Optionally, the method further comprises receiving environmental data during the first time period the derivation of the amount of feed required is further responsive to the environmental data, and further the environmental data comprises at least one of dissolved oxygen level, state of the tide, pH of the water, visibility through the water, intensity of light incident on the water, biomass data, mass of feed being consumed, air and/or water temperature, sunlight, salinity, treatments, sea lice count, fish type, feed type, past and present feed conversion ratio, past and present standard growth rate, oxygen input data, stereo vision data and/or acoustic camera data.

Such data can be useful in generating an accurate model regarding the optimum amount of feed to provide to the fish.

For example, when dissolved oxygen is low, food is liable to metabolize poorly. Higher temperatures may lead to faster growth rates. Sunlight may affect the rate of fish maturity.

Optionally, the real time image data comprises a plurality of image frames. Optionally, real time image data may be provided by a pan-tilt-zoom camera, a fixed colour camera, a fixed black and white camera, and/or a high resolution camera and the method may further comprise adjusting the camera prior to at least one of the steps of receiving real time image data.

Such a camera can be arranged to provide a wide viewing angle, with the ability to focus on a particular area of a fish enclosure. It may be advantageous for a farmer to be aware of a certain area within a cage, for example in the case of a hole allowing for predators to enter, or on a part of a school of fish which seems unhealthy. Such adjustments to the camera may also allow processing to occur in real time.

Optionally, the output comprises an optimised level of feed to provide to the one or more aquatic animals, which may be generated through the use of a loss function and/or through correlation analysis of the real time image and related data comprising one or more analyses in relation to: feed provided to the one or more aquatic animals; activity level of the one or more aquatic animals; wasted feed; and/or environmental data. Optionally, the correlation analysis is performed using neural networks, linear regression, polynomial regression and/or random forests.

Optionally, the activity level of the one or more aquatic animals is monitored over a plurality of individual image frames: optionally the activity level of the one or more aquatic animals comprises speed, schooling behaviour, movement and/or distance from a sensor. Optionally, the activity level of the one or more aquatic animals is labelled to extract features which optimise feeding: wherein the activity level is labelled on low or high perspectives. Optionally, the step of determining the amount of wasted feed comprises distinguishing between feed and waste. Optionally, the step of determining the amount of feed comprises detecting feed pellets at a depth below that at which the one or more aquatic animals normally feed. Optionally, data regarding the one or more aquatic animals is obtained comprising data relating to one or more of: feeding pellets not consumed; feed conversion rate; biomass; animal mortality; animal growth; instructing placement of a derived amount of feed; and/or animal activity.

To help ensure the profitability of raising animals for a farmer, particularly in relation to farmed fish, it can be important to minimise feed wastage. Wasted feed does not contribute to the growth of the fish, which is ultimately why fish are conventionally farmed. Wasted feed may also collect underneath the fish being farmed. The wasted feed that has collected can then decay, encouraging undesirable microbial growth, smothering existing marine ecosystems, and depriving local volumes of water of the oxygen required for the fish to remain healthy. Any chemicals or antibiotics in the feed which settle on the ground may leak into the ecosystem, and cause undesirable effects including tumours, lesions and parasites in aquatic animals local to the fish farm. Therefore, it is desirable to minimise the amount of feed wasted by providing as close to the precise amount of feed required to encourage optimal growth of the fish. Any excess feed is liable to pass uneaten through the fish feeding area and be wasted. A "loss" function can be an efficient way to optimise a particular goal, for example reducing the overall cost of feed and decreasing the feed conversion ratio. The feed conversion ratio (FCR) refers to the amount of feed inputted as kg to the growth in fish in kg.

Optionally, the correlation analysis is performed using a feedback loop: optionally the feedback loop comprises a circular buffer or a state buffer. Optionally, the optimised level of feed is generated by using the feedback loop optimising for one or more variables: optionally the one or more variables comprises any one or more of growth rate to feed conversion ratio, minimal pellet loss, and/or sea lice. Optionally, one or more signal processing techniques is used to build the feedback loop. Optionally, the correlation analysis determines one or more features of the system. Optionally, determining the one or more features of the system comprises a step of correlating one or more signals to the one or more features: optionally the step of correlating the one or more signals to the one or more features comprises multitask learning and/or further optionally the step of correlating the one or more signals to the one or more features comprises converging the one or more signals to the one or more features.

Circular buffers are capable of increasing the speed of within the neural network by storing states over a buffer and implements a feedback loop. In some embodiments, a state buffer may be implemented as a fixed-size queue with explicit shift/append operations and temporal information may be any of RNN, LSTM, or GRUs etc. In training AI, the state buffer may be stored between training steps within a temporal batch which allows to avoid explicit unrolling or unfolding as they may be used in conventional RNNs. The temporal or inter-frame recurrence via a state buffer may be combined with a multi-tasking or intra-frame recurrence.

Optionally, the computer-implemented method is performed using one or more neural networks to form a model: optionally the one or more neural networks is implemented on a graphical processing unit (GPU). Optionally, the one or more neural networks comprise one or more convolutional neural networks (CNNs): optionally the one or more CNNs comprises any one or more architectural models such as ResNet, InseptionNet, and/or SqueezeNet. Optionally, the model is trained and formed to: analyse real time image data to perform feed detection and localization; analyse previous image frames to identify movement and/or warping of pellets relative to current real time image data frames; and enhance the distinction of feed and waste for future image images. Optionally, the one or more neural networks uses one or more feedback loops to provide temporal information: optionally the one or more neural networks comprises any one or more of: Long Short Term Memory (LSTM) neural networks; Recurrent Neural Networks (RN N); or Gated Recurrent Unit (GRU).

Neural networks are computing systems which can be arranged to progressively improve their performance in relation to specific tasks through the use of training. Such training may be provided through labelled examples, or manual correction of the neural network when necessary. Neural networks are conventionally arranged from one or more layers of nodes, wherein each layer is set up to perform a specific role in the overall task to be performed. In this embodiment, a task to be performed may be defining images obtained through real time image data as either "feed" or "not feed", thereby detecting when feed is not being consumed by the fish. The model which is assembled can then provide an efficient feeding schedule and/or quantity of feed in order to minimise waste while still maximising growth rate of the fish. CNNs such as LSTM or RNN can be particularly efficient at classifying, processing, and predicting data points which have been indexed in time order.

Broadly, temporal information may be processed through a feedback loop in the state of individual layers, nodes, or overall networks.

Optionally, the one or more neural networks is used to create a feature set from the real time sensor data by correlating two or more feature signals obtained from the real time sensor data. Optionally, further comprising the step of storing the real time sensor data for later analysis. Optionally, the real time image data is provided via the web for optionally online/offline storage and analysis: optionally wherein the real time image data is in a real time streaming protocol (RTSP); optionally wherein the sensor data is in a real time messaging protocol (RTMP)/a real time transport protocol (RTP)/a hypertext transfer protocol (HTTP); and/or further optionally wherein the RSTP/RTMP/RTP/HTTP comprises a H264/VP8/VP9/H265 format. Optionally, the method further comprises the step of determining from the portion of stored real time sensor data, at least one new parameter for use in deriving an amount of feed. Optionally, the step of determining from the portion of stored data is performed by a deep learning (DL) algorithm.

Offline processing may be performed to improve an algorithm that performs the step of deriving the amount of food required, and hence reduce feed wastage in the future. This processing may occur offsite or locally, for example at night when no feeding is taking place. Deep learning is a form of machine learning which can be very efficient for feature extraction from one or more images. There may be provided a plurality of layers of nonlinear processing units, wherein each successive layer uses as its input and output from the previous layer.

Optionally, a plurality of real time sensor data streams are received individually and/or simultaneously: optionally the plurality of real time sensor data streams are learned simultaneously using multi-task learning; optionally multi-task learning is implemented for simultaneous detection, motion estimation, feed/waste classification and/or characteristic regressions; and/or optionally the plurality of real time sensor data streams are mapped in real time. Optionally, the plurality of real time sensor data streams are mapped in real time on any one or more of: probability maps; heat maps; motion maps; flow maps; and/or unified maps, optionally the plurality of real time sensor data streams are mapped in real time in relation to feed and/or waste, and/or further optionally the plurality of real time sensor data streams mapped in real time trains optical flow.

Outputs may be provided in the form of one or more probability maps/heat maps/motion maps relating to feed and waste individually or together. A form of blob detector may be used in order to localise pellets/waste in respective probability map(s). In order to speed up the process of blob detection, the local maximum probability below a certain threshold can be customised. Motion vectors of images are analysed in the internal facility creating 2D velocity vectors (x,y). Heat map vectors that mimic optical flow produces temporal data which can enhance the system's ability to classify objects based on how different objects fall within the cage.

Optionally, the plurality of real time sensor data comprise data relevant to a plurality of feeding areas. Optionally, the computer-implemented steps are performed locally to the confined space in which the animals are located: optionally the confined space comprises one or more cages and/or one or more farms.

If the farm is in a remote location and may lack a reliable connection to an off-site computer processing facility, it may be more efficient and/or reliable to perform the computer-implemented steps locally.

According to a further aspect, there is provided a computer-implemented method of feeding animals in a confined space containing water, the method comprising the steps of: receiving first real time image data from the confined space during a first time period, determining, from at least the real time image data, an activity level for the animals prior to and/or during feeding, deriving an amount of feed required in response, at least, to the activity level, instructing placement of the derived amount of feed in the confined space, receiving second real time image data from the confined space during a second time period, determining, from at least the second real time image data, what proportion of the feed is not consumed by the animals and/or an activity response of the animals to the feed, receiving third real time image data from the confined space during a third time period, calculating a degree of satiety of the animals from at least the third real time image data, and storing at least a portion of the data in respect of at least one of the time periods.

The three time periods may be defined as follows:
4) BEFORE. The "before" activity may comprise data relating to activity of fish during their anticipation of feed, before the feed has actually been provided.
5) DURING. During feeding the activity may be heavily weighted when a Learned model (also referred to as just a "model") is being developed. The presence of feed pellets can be detected and measured during this time, to provide a recommendation for reducing, maintaining, or increasing the volume of feed. The behaviours of the fish may also be more accurately understood, particularly with regard to their activity during the feeding process.
6) AFTER. The detection of pellets (or lack thereof) and the activity of the fish as a reaction may cause the recommendation of feed for the following feeding session to be adjusted.

Processing visual data from video cameras in the fish cages can form an important part of the feed analysis process. The processing may occur locally or in the cloud. However, many fish farms are in isolated areas with poor network connectivity, and so in such cases local processing would be required.

Optionally, the computer-implemented method is performed using one or more neural networks to form a model: optionally the one or more neural networks is implemented on a graphical processing unit (GPU). Optionally, the one or more neural networks comprise one or more convolutional neural networks (CNNs): optionally the one or more CNNs comprises any one or more architectural models such as ResNet, InseptionNet, and/or SqueezeNet. Optionally, the one or more neural networks uses one or more feedback loops to provide temporal information: optionally the one or more neural networks comprises any one or more of: Long Short Term Memory (LSTM) neural networks; Recurrent Neural Networks (RNN); or Gated Recurrent Unit (GRU). Optionally, any localization and/or tracking of the animals is performed through the use of one or more CNNs.

Neural networks are computing systems which can be arranged to progressively improve their performance in relation to specific tasks through the use of training. Such training may be provided through labelled examples, or manual correction of the neural network when necessary. Neural networks are conventionally arranged from one or more layers of nodes, wherein each layer is set up to perform a specific role in the overall task to be performed. In this embodiment, a task to be performed may be defining images obtained through real time image data as either "feed" or "not feed", thereby detecting when feed is not being consumed by the fish. The model which is assembled can then provide an efficient feeding schedule and/or quantity of feed in order to minimise waste while still maximising growth rate of the fish. CNNs such as LSTM or RNN can be particularly efficient at classifying, processing, and predicting data points which have been indexed in time order. Broadly, temporal information may be processed through a feedback loop in the state of individual layers, nodes, or overall networks.

Optionally, the model is updated over a time period. Optionally, the model is updated using reinforcement learning techniques. Optionally, the model is arranged to continuously learn in real time. Optionally, the activity level is monitored over a plurality of individual image frames. By dynamically updating the model over a time period, for example 10 individual feeding cycles, a more accurate model may be developed by incorporating new learned information and hence less feed may be wasted in the future.

Optionally, the method further comprises receiving environmental data during the first time period the derivation of the amount of feed required is further responsive to the environmental data, and further the environmental data comprises at least one of dissolved oxygen level, state of the tide, pH of the water, visibility through the water, intensity of light incident on the water, biomass data, mass of feed being consumed, air and/or water temperature, sunlight, salinity, treatments, sea lice count, fish type, feed type, past and present feed conversion ratio, past and present standard growth rate, oxygen input data, stereo vision data and/or acoustic camera data.

Such data can be useful in generating an accurate model regarding the optimum amount of feed to provide to the fish. For example, when dissolved oxygen is low, food is liable to metabolize poorly. Higher temperatures may lead to faster growth rates. Sunlight may affect the rate of fish maturity.

Optionally, determining what proportion of the feed is not consumed by the animals comprises distinguishing between feed pellets and waste products of the animals. Optionally, determining what proportion of the feed is not consumed by the animals comprises detecting feed pellets at a depth below that at which the animals normally feed.

Such distinguishing may be performed by detecting feed pellets at a depth below that at which the animals normally feed.

Optionally, data regarding the animals is shown to an operator via a user interface (UI). Optionally, the data regarding the animals includes data relating to one or more of: feeding pellets not consumed, animal mortality, instructing placement of the derived amount of feed, and/or animal activity. Optionally, data regarding the animals is transmitted to an operator via the Internet. Optionally, instructing placement of the derived amount of feed comprises displaying the amount on a user interface. Optionally, instructing placement of the derived amount of feed comprises signalling to feed distribution apparatus.

A user interface, for example in the form of a dynamic bar, can provide useful information to farmers in a more convenient manner. Pictures may be provided as evidence to a farmer as to why certain conclusions were reached and/or why certain decisions were recommended. The farmer may then be able to act more effectively and efficiently when managing the farm. Data, for example regarding negatively impactful feeding patterns and interpretation of the results of analysis from CNNs and/or a function $F(x)$ used, may be transmitted to a farmer or manager. Such transmission may be via the Internet, and can provide useful information regarding future decisions to be made. Signalling directly to a feed distribution apparatus can provide a level of automation to the farm, wherein feed can be provided automatically where it is required.

Optionally, the step of deriving the amount of feed required further comprises deriving a rate at which the feed should be supplied.

Feeding the fish too quickly is likely to result in waste of feed.

Optionally, data regarding the one or more aquatic animals is obtained comprising data relating to one or more of: feeding pellets not consumed; feed conversion rate; biomass; animal mortality; animal growth; instructing placement of a derived amount of feed; and/or animal activity.

Optionally, real time image data may be provided by a pan-tilt-zoom camera, a fixed colour camera, a fixed black and white camera, and/or a high resolution camera and the method may further comprise adjusting the camera prior to at least one of the steps of receiving real time image data.

Such a camera can be arranged to provide a wide viewing angle, with the ability to focus on a particular area of a fish enclosure. It may be advantageous for a farmer to be aware of a certain area within a cage, for example in the case of a hole allowing for predators to enter, or on a part of a school of fish which seems unhealthy. Such adjustments to the camera may also allow processing to occur in real time.

Optionally, the method further comprises the step of triggering an alarm in response to at least one of the feeding process being wrong, detected levels of dissolved oxygen dropping, and/or the presence of other species of animal in the confined space. Detection of anomalies may also alert the farmer, for example, over a period of time patterns are understood and if certain activity is unusual based on various factors an alarm may be triggered.

The feeding process being wrong and the presence of other species of animal in the confined space (for example, sharks or jellyfish), can significantly damage the fish on a fish farm. Such damage may be in the form of physical attacks to the fish themselves, or may reduce the level of dissolved oxygen in the water. Therefore, it can be advantageous for a farmer to be informed of such events as soon as possible, for example through the use of an alarm system, in order to mitigate the negative effects. Any alarms (also referred to as alerts) may be stored in a cloud server or locally, and may, for example, provide information relating to feeding patterns and graphs of previously supplied recommendations to maximise efficient running of farms in the future. Information may also be stored and provided in relation to actions that a farmer took, which can be advantageous to management-level employees when running a fish farm. Such data storage, retrieval, and supply for future use may be applied to any data recorded or created via processing through the use of the apparatus or method or system disclosed herein. The detection process of such other species may be arranged to identify any species which is not the species of animal being farmed.

Optionally, at least two of the first, second and third steps of receiving real time image data are performed simultaneously for the confined space and at least one further confined space.

Such an arrangement can provide a quicker processing of the real time image data, and hence feedback useful information to a farmer more quickly. Any feed suggestions may then be implemented as soon as possible to maximise efficiency of feeding.

Optionally, the computer-implemented steps are performed locally to the confined space in which the animals are located; optionally wherein the confined space comprises one or more cages and/or one or more farms.

If the farm is in a remote location, and may lack a reliable connection to an off-site computer processing facility, it may be more efficient and/or reliable to perform the computer-implemented steps locally.

According to a further aspect, there is provided an apparatus for controlling the feeding of one or more aquatic animals, the apparatus comprising: an input for receiving real time image data; a memory; and a processor arranged to: determine, from at least the real time image data, an amount of wasted feed; and generate an output when a predetermined level of wasted feed is determined.

According to a further aspect, there is provided an apparatus for controlling the feeding of animals in a confined space containing water, the apparatus comprising: an input for receiving a video signal from at least one video sensor, a memory, and a processor arranged to: determine, from at least the video signal, an activity level for animals prior to and/or during feeding, derive an amount of feed required in response, at least, to the determined activity level, instruct placement of the derived amount of feed in the confined space, determine, from at least the video signal, what proportion of the feed is not consumed by the animals and/or an activity response of the animals to the feed, calculate, from at least the video signal, a degree of satiety of the animals after feeding, and store in the memory at least data in respect of at least one of the activity level of the animals prior to feeding, the derived amount of feed, the proportion of feed not consumed by the animals and the satiety of the animals after feeding, a combination of machine learning and stereo vision cameras to perform biomass estimation and sea lice counting. Biomass estimation may be carried out using stereo vision data and training a single view camera and a depth parameter.

Such an apparatus can provide the advantages described herein in relation to the computer-implemented method of feeding animals in a confined space containing water.

Optionally, an input is provided for a signal from at least a further video sensor and arranged to process real time image data from at least two distinct confined spaces in parallel. Optionally, an input is provided for receiving a further video signal corresponding to at least one further confined space.

Farmers may have more than one confined space comprising fish being farmed, and so it can be advantageous to monitor more than one confined space simultaneously.

The same refinements apply to the apparatus and system as to the method.

According to a further aspect, there is provided a system for controlling the feeding of animals in a confined space containing water, comprising: an input for receiving real time image data; a memory; and a processor arranged to: determine, from at least the real time image data, an amount of wasted feed; and generate an output when a predetermined level of wasted feed is determined.

According to another aspect, there is provided a computer-implemented method of feeding animals in a confined space containing water, the method comprising the steps of: receiving first video data from the confined space during a first time period, determining, from at least the video data, an activity level for the animals prior to and/or during feeding, deriving an amount of feed required in response, at least, to the activity level, instructing placement of the derived amount of feed in the confined space, receiving second video data from the confined space during a second time period, determining, from at least the second video data, what proportion of the feed is not consumed by the animals and/or an activity response of the animals to the feed, receiving third video data from the confined space during a third time period, calculating a degree of satiety of the animals from at least the third video data, and storing at least a portion of the data in respect of at least one of the time periods.

To help ensure the profitability of raising animals for a farmer, particularly in relation to farmed fish, it can be important to minimise feed wastage. Wasted feed does not contribute to the growth of the fish, which is ultimately why fish are conventionally farmed. Wasted feed may also collect underneath the fish being farmed. The feed can then decay, encouraging undesirable microbial growth, smothering existing marine ecosystems, and depriving local volumes of water of the oxygen required for the fish to remain healthy. Any chemicals or antibiotics in the feed which settle on the ground may leak into the ecosystem, and cause undesirable effects including tumour, lesions and parasites in aquatic animals local to the fish farm. Therefore, it is desirable to minimise the amount of feed wasted by providing the precise amount of feed required to encourage optimal growth of the fish. Any excess feed is liable to pass uneaten through the fish feeding area and be wasted.

The three time periods may be defined as follows:
1) BEFORE. The "before" activity may comprise data relating to activity of fish during their anticipation of feed, before the feed has actually been provided.
2) DURING. During feeding the activity may be heavily weighted when a Learned model (also referred to as just a "model") is being developed. The presence of feed pellets can be detected and measured during this time, to provide a recommendation for reducing, maintaining, or increasing the volume of feed. The behaviours of the fish may also be more accurately understood, particularly with regard to their activity during the feeding process.
3) AFTER. The detection of pellets (or lack thereof) may cause the recommendation of feed for the following feeding session to be adjusted.

Processing visual data from video cameras in the fish cages can form an important part of the feed analysis process. The processing may occur locally or in the cloud. However, many fish farms are in isolated areas with poor network connectivity, and so in such cases local processing would be required.

Optionally, the computer-implemented method is performed using one or more neural networks to form a model. Optionally, the one or more neural networks comprise one or more convolutional neural networks (CNNs). Optionally, the one or more neural networks comprise Long Short Term Memory (LSTM) neural networks. Optionally, any localization and/or tracking of the animals is performed through the use of one or more CNNs.

Neural networks are computing systems which can be arranged to progressively improve their performance in relation to specific tasks through the use of training. Such training may be provided through labelled examples, or manual correction of the neural network when necessary. Neural networks are conventionally arranged from one or more layers of nodes, wherein each layer is set up to perform a specific role in the overall task to be performed. In this embodiment, a task to be performed may be defining images obtained through video data as either "feed" or "not feed", thereby detecting when feed is not being consumed by the fish. The model which is assembled can then provide an efficient feeding schedule and/or quantity of feed in order to minimise waste while still maximising growth rate of the fish. CNNs and LSTM neural networks are forms of recurrent neural networks, which can be particularly efficient at classifying, processing, and predicting data points which have been indexed in time order.

Optionally, the model is updated over a time period. Optionally, the model is updated using reinforcement learning. Optionally, the activity level is monitored over a plurality of individual image frames.

By updating the model over a time period, for example 10 individual feeding cycles, a more accurate model may be developed and hence less feed may be wasted in the future. Reinforcement learning does not require the presentation of correct input and output pairs as with conventional machine learning. Instead a balance is developed between the exploitation of known data and the exploration of unknown information, making reinforcement learning particularly suited to problems which include long term versus short term rewards. By monitoring the activity level over a plurality of individual image frames, more data is gathered and hence a more accurate model may be generated.

Optionally, the method further comprises receiving environmental data during the first time period wherein the derivation of the amount of feed required is further responsive to the environmental data, and further wherein the environmental data comprises at least one of dissolved oxygen level, state of the tide, pH of the water, visibility through the water, intensity of light incident on the water, biomass data, mass of feed being consumed, air and/or water temperature, and/or sunlight.

Such data can be useful in generating an accurate model regarding the optimum amount of feed to provide to the fish. For example, when dissolved oxygen is low, food is liable to metabolize poorly. Higher temperatures may lead to faster growth rates. Sunlight may affect the rate of fish maturity.

Optionally, determining what proportion of the feed is not consumed by the animals comprises distinguishing between feed pellets and waste products of the animals. Optionally, determining what proportion of the feed is not consumed by the animals comprises detecting feed pellets at a depth below that at which the animals normally feed.

Such distinguishing may be performed by detecting feed pellets at a depth below that at which the animals normally feed.

Optionally, data regarding the animals is shown to an operator via a user interface (UI). Optionally, the data regarding the animals includes data relating to one or more of: feeding pellets not consumed, animal mortality, instructing placement of the derived amount of feed, and/or animal activity. Optionally, data regarding the animals is transmitted to an operator via the Internet. Optionally, instructing placement of the derived amount of feed comprises displaying the amount on a user interface. Optionally, instructing placement of the derived amount of feed comprises signalling to feed distribution apparatus.

A user interface, for example in the form of a dynamic bar, can provide useful information to farmers in a more convenient manner. Pictures may be provided as evidence to a farmer as to why certain conclusions were reached and/or why certain decisions were recommended. The farmer may then be able to act more effectively and efficiently when managing the farm. Data, for example regarding negatively impactful feeding patterns and interpretation of the results of analysis from CNNs and/or a function F(x) used, may be transmitted to a farmer or manager. Such transmission may be via the Internet, and can provide useful information regarding future decisions to be made. Signalling directly to a feed distribution apparatus can provide a level of automation to the farm, wherein feed can automatically be provided where it is required.

Optionally, the step of deriving the amount of feed required further comprises deriving a rate at which the feed should be supplied.

Feeding the fish too quickly is likely to result in waste of feed.

Optionally, video data may be provided by a pan-tilt-zoom camera and the method may further comprise adjusting the camera prior to at least one of the steps of receiving video data.

Such a camera can be arranged to provide a wide viewing angle, with the ability to focus on a particular area of a fish enclosure. It may be advantageous for a farmer to be aware of a certain area within a cage, for example in the case of a hole allowing for predators to enter, or on a part of a school of fish which seems unhealthy. Such adjustments to the camera may also allow processing to occur in real time.

Optionally, the method further comprises the step of triggering an alarm in response to at least one of the feeding process being wrong, detected levels of dissolved oxygen dropping, and/or the presence of other species of animal in the confined space.

The feeding process being wrong and the presence of other species of animal in the confined space (for example, sharks or jellyfish), can significantly damage the fish on a fish farm. Such damage may be in the form of physical attacks to the fish themselves, or may reduce the level of dissolved oxygen in the water. Therefore, it can be advantageous for a farmer to be informed of such events as soon as possible, for example through the use of an alarm system, in order to mitigate the negative effects. Any alarms (also referred to as alerts) may be stored in a cloud server or locally, and may, for example, provide information relating to feeding patterns and graphs of previously supplied recommendations to maximise efficient running of farms in the future. Information may also be stored and provided in relation to actions that a farmer took, which can be advantageous to management-level employees when running a fish farm. Such data storage, retrieval, and supply for future use may be applied to any data recorded or created via processing through the use of the apparatus or method or system disclosed herein. The detection process of such other species may be arranged to identify any species which is not the species of animal being farmed.

Optionally, the computer-implemented steps are performed locally to the confined space in which the animals are located.

If the farm is in a remote location, and may lack a reliable connection to an off-site computer processing facility, it may be more efficient and/or reliable to perform the computer-implemented steps locally.

Optionally, the method further comprises the step of determining from the portion of stored data, at least one new parameter for use in deriving an amount of feed. Optionally, the step of determining from the portion of stored data is performed by a deep learning (DL) algorithm.

Offline processing may be performed to improve an algorithm that performs the step of deriving the amount of food required, and hence reduce feed wastage in the future. This processing may occur offsite or locally, for example at night when no feeding is taking place. Deep learning is a form of machine learning which can be very efficient for feature extraction from one or more images. There may be provided a plurality of layers of nonlinear processing units, wherein each successive layer uses as its input an output from the previous layer.

Optionally, at least two of the first, second and third steps of receiving video data are performed simultaneously for the confined space and at least one further confined space.

Such an arrangement can provide a quicker processing of the video data, and hence feed back useful information to a farmer more quickly. Any feed suggestions may then be implemented as soon as possible to maximise efficiency of feeding.

According to a further aspect, there is provided an apparatus for controlling the feeding of animals in a confined space containing water, the apparatus comprising: an input for receiving a video signal from at least one video sensor, a memory, and a processor arranged to: determine, from at least the video signal, an activity level for animals prior to and/or during feeding, derive an amount of feed required in response, at least, to the determined activity level, instruct placement of the derived amount of feed in the confined space, determine, from at least the video signal, what proportion of the feed is not consumed by the animals and/or an activity response of the animals to the feed, calculate, from at least the video signal, a degree of satiety of the animals after feeding, and store in the memory at least data in respect of at least one of the activity level of the animals prior to feeding, the derived amount of feed, the proportion of feed not consumed by the animals and the satiety of the animals after feeding.

Such an apparatus can provide the advantages described herein in relation to the computer-implemented method of feeding animals in a confined space containing water.

Optionally, an input is provided for a signal from at least a further video sensor and arranged to process video data from at least two distinct confined spaces in parallel. Optionally, an input is provided for receiving a further video signal corresponding to at least one further confined space.

Farmers may have more than one confined space comprising fish being farmed, and so it can be advantageous to monitor more than one confined space simultaneously.

The same refinements apply to the apparatus as to the method.

According to a further aspect, there is provided an apparatus operable to perform the method of any preceding feature.

According to a further aspect, there is provided a system operable to perform the method of any preceding feature.

According to a further aspect, there is provided a computer program operable to perform the method and/or apparatus and/or system of any preceding feature.

BRIEF DESCRIPTION OF DRAWINGS

The present invention will now be described, by way of example, with reference to the accompanying drawings, in which.

SPECIFIC DESCRIPTION

The following described embodiments focus on the example of salmon farming but the techniques disclosed are applicable in other embodiments to all water-based animals, including crustaceans and particularly finfish (that is fish with spines and fins such as sea bass and tilapia, besides salmon).

Presently, farmed fish are kept in cages in the sea (although some or aspects of embodiments are equally applicable to fish farming in dedicated tanks or in other enclosed environments) and various monitoring of the fishes' conditions is performed via video cameras and environmental sensors.

Figure 1:
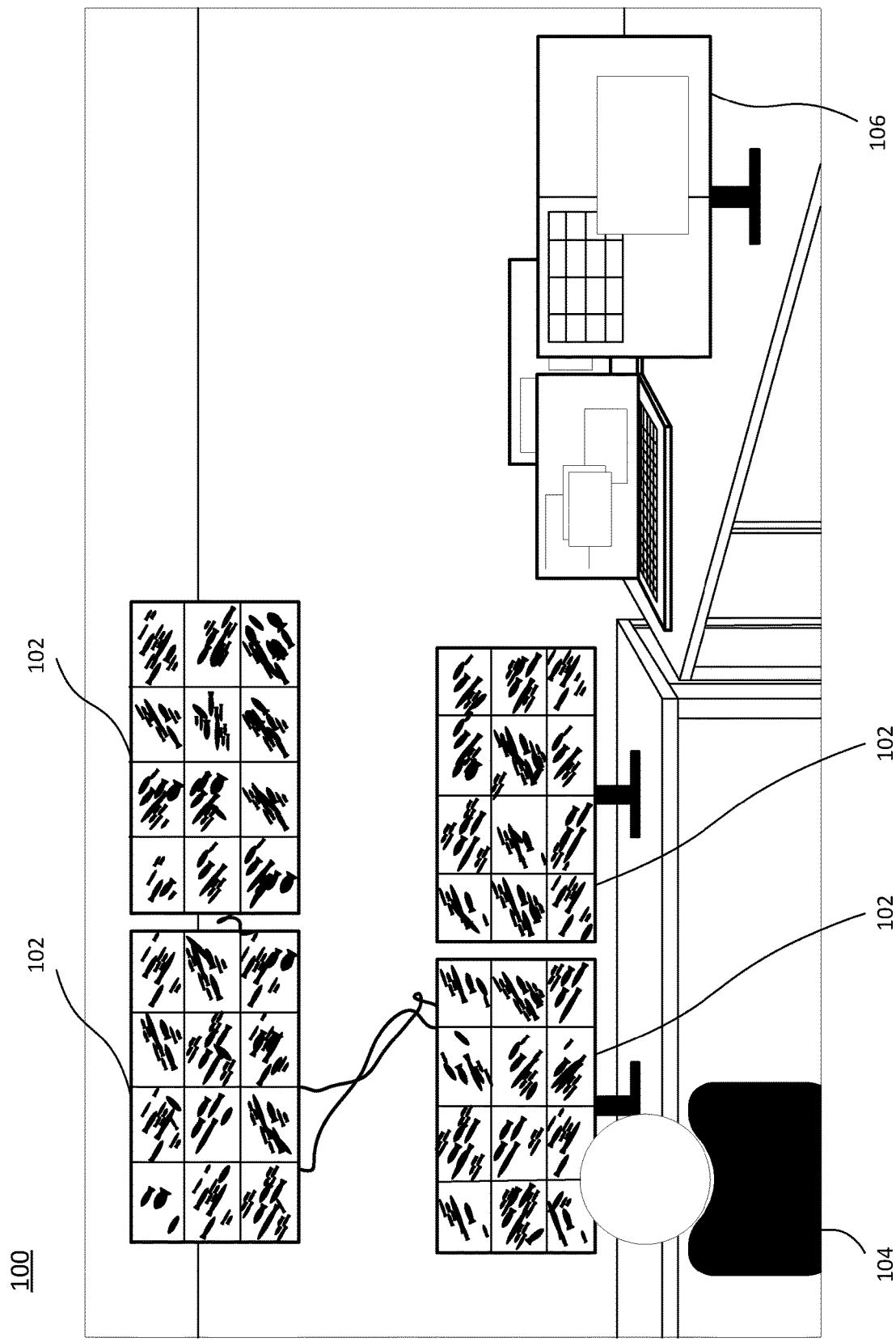
FIG. 1 shows a typical control room for a fish farm.

This monitoring is displayed to a farmer or operator typically via screens provided in a control room such as shown in FIG. 1. In the example shown in FIG. 1, a control room 100 is shown with a human operator 104 positioned to be able to view four display screens 102 which are displaying the fish in each of a number of cages for the human operator 104 to be able to view. The control room 100 is also provided with a computer 106 to allow the operator 104 to be able to control aspects of the fish farm such as the pellet feeding machinery etc.

The video data in Real Time Streaming Protocol (RTSP) using various formats such as h264 etc. is also provided via the web for optional offline storage and analysis (which may occur offsite, e.g. in the cloud or onsite). In some embodiments this data is analysed across a number of cages and/or farms to effect improvement in one or more learned functions/models for decision making. Data may be received in various other formats such as a real time messaging protocol (RTMP)/a real time transport protocol (RTP)/a hypertext transfer protocol (HTTP) and/or various formats such as H264, VP8, VP9, H265.

All of the immediate processing may be provided by a computer local to the farm. This is often necessary since farms are in isolated locations with poor network connectivity. Typically, the sample frames and recorded data referred to above will be uploaded to the cloud during the night when no feeding is occurring (and there is plenty of time to compensate for the poor data rate). Offline processing may then be conducted in the cloud to improve the one or more learned models.

Computer vision techniques are applied to process the video feed data available at a fish farm in order to extract features from this data and output analysis of various factors of interest, such as fish activity and/or wasted pellets.

Activity Monitoring

FIG. 1 shows an operator (farmer) confronted with a number of video monitors showing the activity in the various cages of the farm.

By pre-processing the available data for operators, operation and/or remote management may be enhanced by one or more artificial intelligence (AI) arrangements capable of outputting important pieces of management/operation information or warnings, which may include: which cages to focus on if certain cages are not meeting forecasts; which fish are ready to feed based on their detected activity; and whether pellet feeding should commence or stop for each cage based on activity in that cage.

Various types of video cameras are presently used in the cages (or a mix thereof) such as: fixed colour, fixed black and white and also pan-tilt-zoom (PTZ) cameras that can be controlled by the operator. A typical farm conventionally has between 8 and 38 individual cages (although 72 cages are not unknown), and an operator of such a farm may have a great deal of information to absorb. For example, FIG. 1 shows a control room in which there are 40 video feeds. As a consequence, running of the farm will usually occur in a sub-optimal manner, even for the most experienced farmers. This is particularly apparent when it comes to feeding. At present, observation of the fishes' behaviour prior to feeding is a main factor in deciding the quantity of feed as well as the rate of feeding.

Embodiments address avoiding the wastage of feed pellets through analysis of the fishes' behaviour prior to feeding to establish when to start and/or stop feeding.

One or more trained neural networks generates, in real-time or substantially real-time, a set of useful features by breaking down incoming video data-streams, for example to output a level of fish activity in each cage. Features may be reasoned, shown to farmers and provided as input to a decision model or feeding/feed optimisation system.

The one or more trained neural networks can output an activity model which may be provided/displayed which scales in an approximately linear fashion and provides information to the operator for any or all of the cages.

In some cases, there might be limited hardware capacity such as limited data streams available in parallel and/or limited displays to show the operator relevant data. Algorithms used may implement frame-switching on streams to run one or more first "shallow" activity neural networks across a number (n) of cages in a farm. Each network may be in the form of a trained neural network. A typical number of cages processed can be twelve, so this is used as an example in this embodiment. The one or more activity networks can take the video data from the cages and predict fish appetite by assessing factors such as the general schooling behaviour, and/or the depth and speed at which the fish are moving about the cage. In cyclic feeding, cages are conventionally fed for 5 minutes approximately every 45 minutes to 1 hour, so fish anticipate food in advance and exhibit behaviours that indicate broadly the appetite of the fish. Extra auxiliary data may be provided to predict and/or enhance the feeding planning.

The one or more first networks can be arranged to monitor and provide generic feedback on all cages at all times (also referred to as "activity"). The second, more complex, network can be arranged to specifically watch feeding cages (i.e. cages that are about to be in/presently in/shortly after a state of feeding—or any combination or all of these states), both during and/or after feeding has occurred. This arrangement can be scaled such that if desired all cages can be monitored simultaneously (which may slightly reduce accuracy for a given processing power, depending on the available local computer hardware), or specific or a group of cages can be given individual/more dedicated attention. The system can be adapted by changing around the number of cages observed by the first and/or second networks at any given period of time, or by ensuring sufficient computing power is provided by the computer hardware deployed.

In embodiments, the analysis of the fish behaviour is automated and is converted into an output such as a suggested amount of feed and/or a rate of feed supply for the farmer to implement. Fish activity may be detected using data-streams from image sensors, acoustic cameras and/or stereo vision cameras etc.

Figure 2:
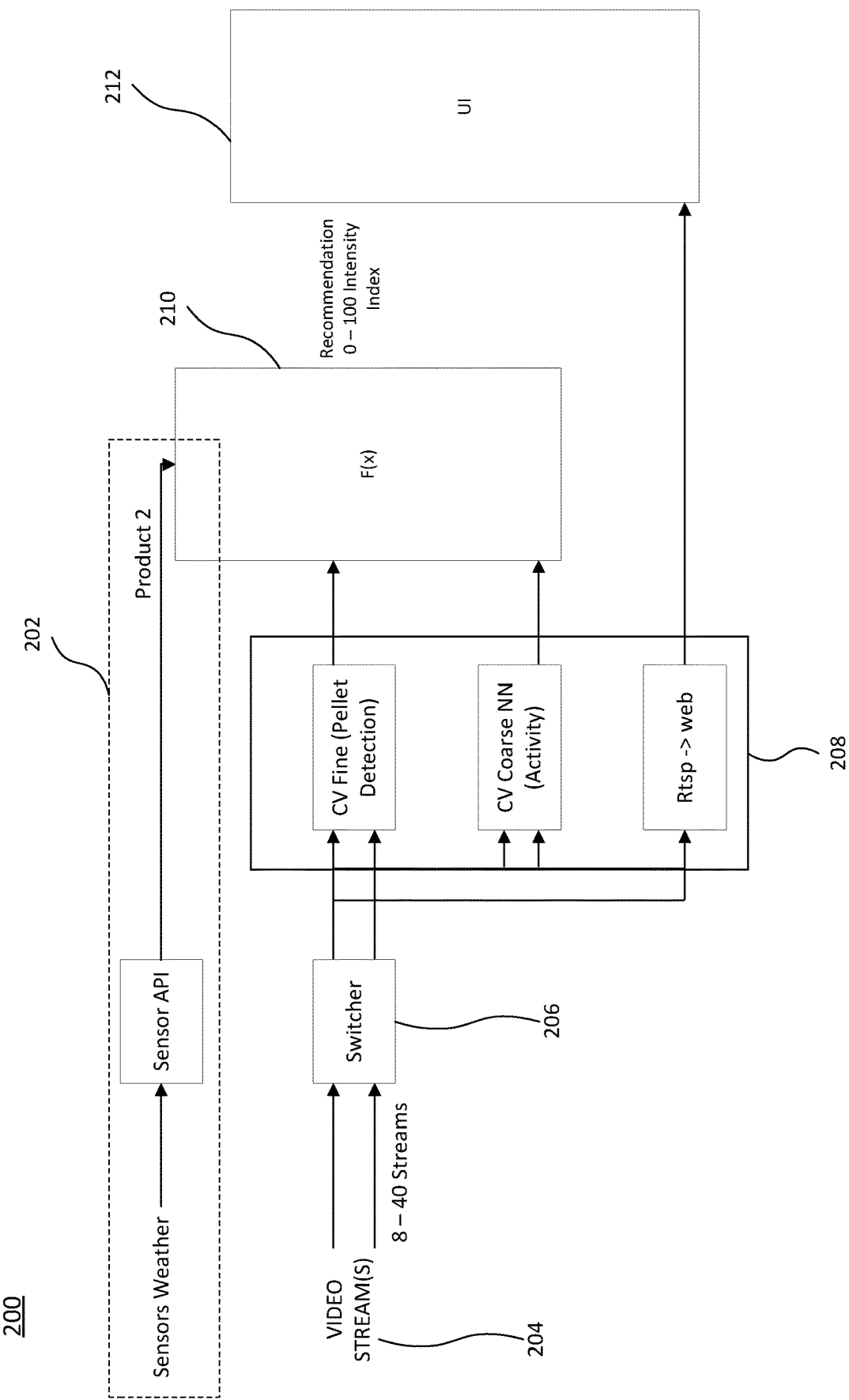
FIG. 2 shows a block schematic diagram of an example embodiment.

FIG. 2 shows a block schematic diagram 200 of an embodiment that analyses the behaviour of the aquatic animals and the derives the appropriate feed amounts and rates which may be communicated to the farmer via a user interface 212 or automatically implemented where remote control of the food supply is available. Video streams (using RSTP streams) 204 may be obtained and input into a computer vision module 208 which processes and analyses the behaviour of the aquatic animals.

The present embodiment converts the observed behaviour of the aquatic animals into an activity factor and may be referred to as a cycle feeding arrangement. Activity detection is performed by a neural network which is fed video data comprising a broad (or coarse) view of the relevant cage. Salmon, for example, typically swim in a doughnut pattern near to the surface of the water. When the aquatic animals are hungry, this pattern changes to nearer the surface of the water and the aquatic animals swim more densely together. This factor may be conveniently determined on a scale of 0 to 1 and may or may not be shared directly with the farmer. (In the figures, this has been combined with an assessment of feeding behaviour and is shown to the farmer on a scale of 1-100 where 100 represents perfect feeding behaviour.) The activity factor looks at speed, schooling behaviour, movement and distance of aquatic animals from cameras and is then combined with further data regarding the aquatic animals in the cage, in particular the number, age and size of the aquatic animals. A neural network evaluation of existing data is used to create a feature set from the input data whereby two to more feature signals are generated and considered orthogonal to all other features extracted. Feature extraction from activity detection is helpful for anomaly detection and reinforcement learning algorithms further in the analysis process.

In other embodiments meal feeding may be performed by the fish farm, which comprises providing fish a day's worth of feeding across a number of hours (typically 1-3 hours). Similar fish activity factors, for example the doughnut-shaped pattern of swimming, may be looked out for when implementing such meal feeding embodiments.

In some embodiments, models may be trained on lower or higher perspectives of labelling activity of fish as appropriate such as a more detailed scale or a high-level classification system in activity labelling.

Wasted Pellet Detection

The operator will typically also have remote control of the quantity and rate of feed applied to each of the cages, i.e. using a pellet feeding machine control system to provide feed pellets to any one or more of the cages. Knowledge of when pellets are being wasted would be useful to improve control of the feeding for each cage of fish.

In pre-processing the available data for operators, operation and/or remote management may be enhanced by one or more artificial intelligence (AI) arrangements capable of outputting important pieces of management/operation information or warnings, which may include: which cages to focus on if certain cages are not meeting forecasts; and whether pellet feeding should commence or stop for each cage based on detected wasted feed.

It has been estimated that a favourable level of feeding can add around £32,000 per site to the value of stock in a typical fish farm per day. Inexperience or inattention from the farmer can reduce this amount significantly with clear and dramatic economic consequences. Information from fish feed companies typically suggests somewhat smaller amounts of feed can actually be consumed by the fish than is provided to the fish at most fish farms. All of this results in most farming processes being less efficient than expected. Additionally, if the fish take longer to grow to their final size due to sub-optimal feeding, they are more at risk from disease etc. Two such risks are sea lice and algal blooms (in 2016 alone algal blooms cost the industry nearly $1Bn). These risks can be reduced significantly by shortening the time spent by fish in the cages. Farmers thus seek to feed the fish as much as possible to accelerate growth but have to balance this against wasting feed.

On the other hand, supplying more feed than the fish can consume will reduce operating margins due to the resulting waste of feed and the cost implications of this. Since feed contributes around 50% of the cost of raising farmed fish, a poor feed conversion ratio (or "FOR") can contribute a significant cost (it has been estimated that even an experienced farmer wastes up to 7% of feed). Reducing the amount of waste will have environmental benefits as well as economic ones. Further embodiments (discussed below) also detect the wasted feed and utilise this information to improve one or more decision making algorithms and/or models.

One or more trained neural networks generate, in real-time or substantially real-time, a set of useful features by breaking down data-streams, for example to output detected wasted pellet data. Features may be reasoned, shown to farmers and optionally provided as input to a decision model or feeding/feed optimisation system.

The number of pellets detected going past a camera, and hence not eaten by the fish, can be provided as an output from the system. An exponential curve can be used to show a relevant value function, as 10 pellets being missed is exponentially worse than 1 pellet.

In some embodiments there is detection of wasted feed pellets. However, fish waste (i.e. faeces) is typically of a very similar size to feed pellets, making the confident detection of feed pellets difficult for the naked eye. In embodiments of the present invention a high-resolution image (from a portion of an image taken by a high-resolution camera or from a PTZ camera) is analysed to identify wasted feed pellets accurately. Suitable camera placement will be apparent to a farmer. In other embodiments, neural networks may be capable of identifying feed and waste in combination with human input.

Pellet detection may be performed using a convolutional neural network which obviates the problems of trying to distinguish between feed and fish waste using the naked eye. While the size of the pellets and the fish waste is similar, the shape and velocities are different. Food pellets are typically rounder while waste is irregularly shaped. Food pellets thus float downwards more quickly which allows the neural network can thus distinguish between fish waste and feed pellets. The neural network may be divided into 3 distinct processes, which are trained simultaneously via the fully convolutional model: (1) a complete frame of video is analysed to perform pellet detection and localisation; then (2) information from earlier frames of video are analysed to identify movement and/or warping factor of pellets relative to the current frame; and then (3) the outputs of both analysis are utilised in a feedback loop to enhance the distinction of feed from waste for future frames.

The neural network is preferably implemented on a graphical processing unit (GPU). In this embodiment, the pellets of feed are tracked during the feeding step of the process. Typically, fish will feed at a known depth beneath the surface of the water. Once feed has fallen beneath this level it is regarded as wasted. By tracking the wasted feed pellets, feedback can be provided to the feeding algorithm to modify the amount and/or rate of feeding for future feeding. This could be conducted for the specific farm and/or individual cage under consideration or it could be part of a longer feedback loop which processes data offline.

A circular buffer may be implemented as an element of pellet detection by as a means to efficiently process and store temporal information of how pellets and feed waste fall. Circular buffers allow for more efficient training of smaller models which can process data at 200 frames per second (FPS) on relative mid-market value GPUs which means an example set of 12 camera streams can be on watch per cage with a high level of accuracy and greater efficiency. This may be done with cameras facing any degree of angle.

The input involves pre-processing data for zero mean normalisation using data augmentation. Image classification is approached by means of training and implementing a combination of convolutional network architectural model structures, such as ResNet, InseptionNet and SqueezeNet. Image features are outputted into fixed size circular buffers, which rotate frame by frame as the system identifies objects, introducing previous temporal information to help in both localisation and classification of pellet/waste objects.

Circular buffers are capable of increasing the speed of within the neural network by storing states over a buffer and implements a feedback loop. In some embodiments, a state buffer may be implemented as a fixed-size queue with explicit shift/append operations and temporal information may be any of RNN, LSTM, or GRUs etc. In training AI, the state buffer may be stored between training steps within a temporal batch which allows to avoid explicit unrolling or unfolding as they may be used in conventional RNNs. The temporal or inter-frame recurrence via a state buffer may be combined with a multi-tasking or intra-frame recurrence.

Outputs are provided in the form of one or more probability maps/heat maps/motion maps relating to feed and waste individually or together. A form of blob detector, is used in order to localise pellets/waste in respective probability map(s). In order to speed up the process of blob detection, the local maximum probability below a certain threshold is customised. Motion vectors of images are analysed in the internal facility creating 2D velocity vectors (x,y). Heat map vectors that mimic optical flow produces temporal data which enhances the system's ability to classify objects based on how different objects fall within the cage. The two outputs and model state flow back into the circular buffer and the procedure is repeated and utilised to enhance the distinction of feed from waste.

In a further example, Localisation may also be carried out by applying an N×N GRID to an Image. Each grid element contains the labels [p, bx, by, bh, bw, c1, c2] with length L. Where p is the probability of an object being inside this grid space, bx and by are the center coordinates of object, bh and bw are width and height of object, and c1, and c2 would be the respective probabilities indicative of a particular class. The labels can then be duplicated and concated to provide a multi class detection for the grid. Duplication may occur A times. Thus, the output layer would be a N×N×L*A and predictions can be taken of the localisation from thereon.

Figure 3:
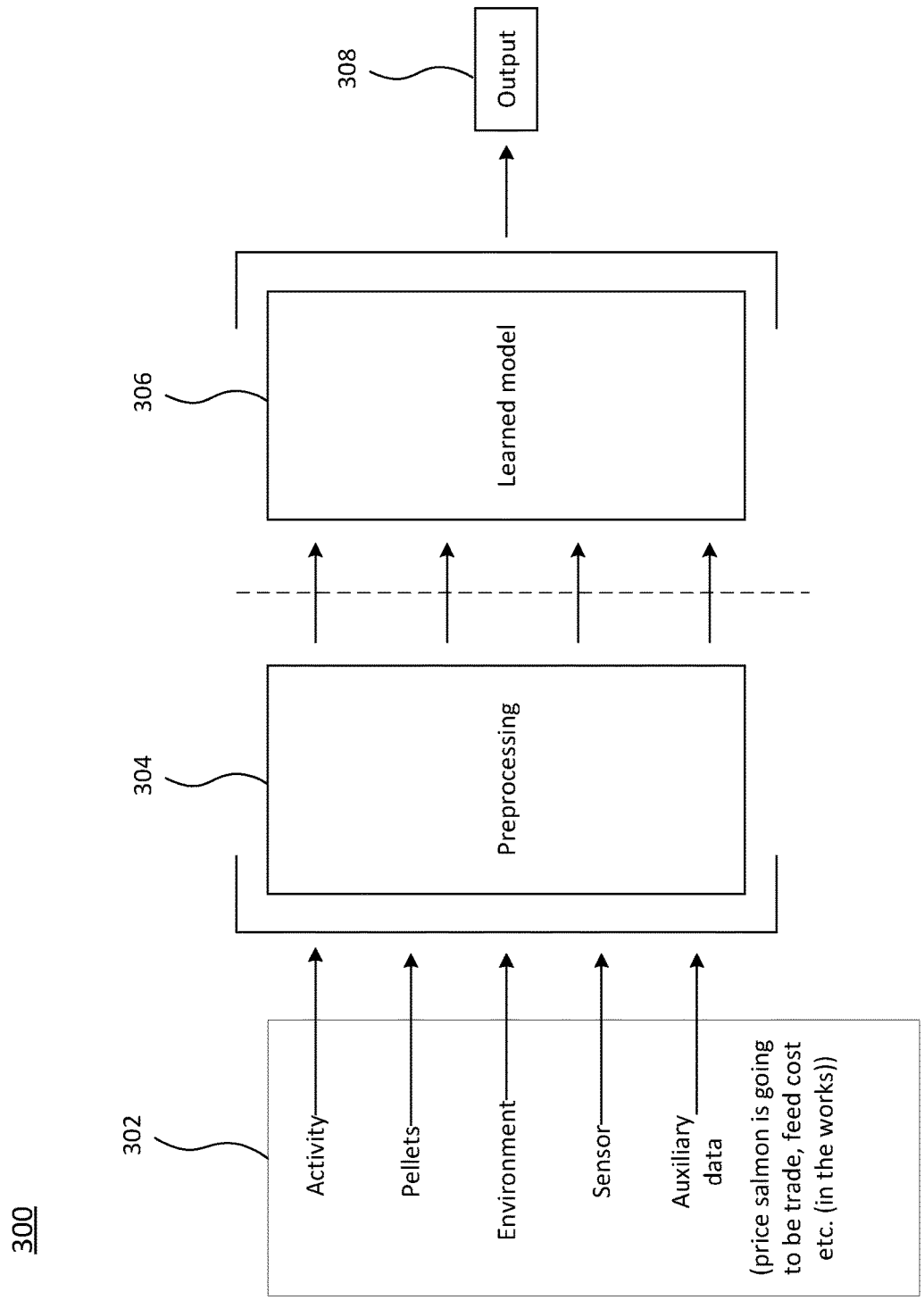
FIG. 3 shows a block schematic diagram illustrating further detail of part of the example embodiment.
Figure 4:
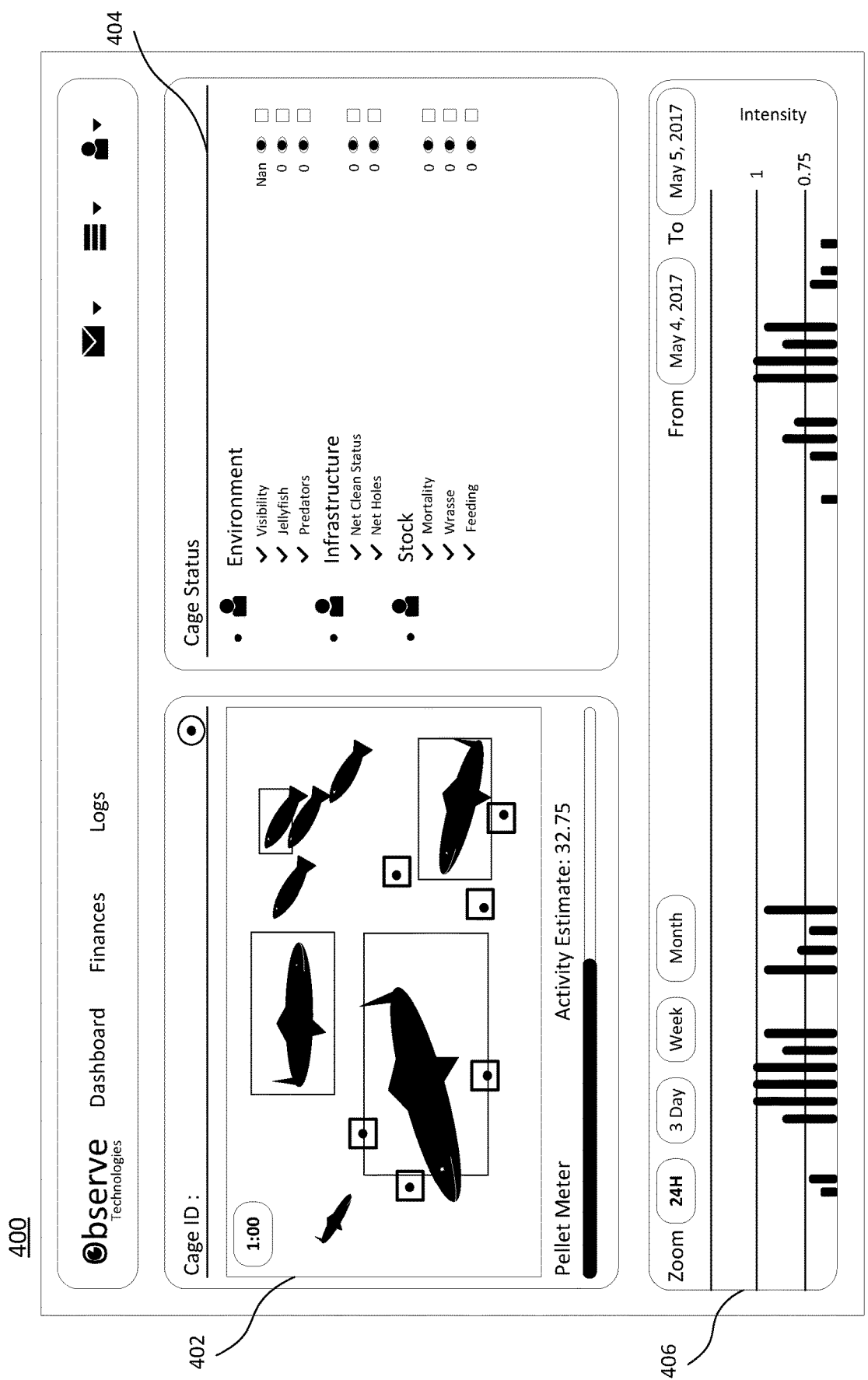
FIG. 4 shows a user interface illustrating feed waste detection.

The location of pellets may be shown to an operator via a User Interface (UI) as shown in FIG. 3 and FIG. 4.

The combination of Activity Monitoring and Waster Pellet Detection will now be described in more detail.

Other embodiments combine both analysis of behaviour and detecting wasted feed.

Linear regression/random forests may be used to correlate the pellet detection and activity levels to environmental data across time. Reinforcement learning may be used to learn how each cage behaves individually based on factors which may include pellet counts, fish activity, and dissolved oxygen level in the water. In some embodiments, polynomial regression may be implemented as a form of regression analysis. In order to learn algorithms and analyse data to be used is classification of data and its analysis, some embodiments may utilize supervised learning models such as Support Vector Machines (SVMs, or Support Vector Networks) etc. as well as neural networks.

Dissolved oxygen data can also be provided alongside activity and/or detected wasted pellet data as it is conventionally undesirable to administer feed pellets when dissolved oxygen is below a certain threshold value.

In addition, it is preferred that further data are supplied to the algorithm such as environmental data (for example, a Weather Sensor is provided in the embodiment shown in FIG. 2, which shows how the sensor data is processed 212, where the sensor data being output from the sensor is input into a sensor API and then input into a decision module 210) including water temperature and dissolved oxygen content. Higher water temperatures lead to increased amounts of feed while lower dissolved oxygen content leads to decreased amounts of feed. The degree to which the environmental data affects the amount of feed depends upon the size of the fish and their previous feeding behaviour.

Preferably, the analysis will also take account of the outputs of environmental sensors such as any one or more of the following: temperature sensors, dissolved oxygen sensors, tide sensors, daylight sensors, salinity sensors saturation sensors and rainfall sensors.

FIG. 2 shows a block schematic diagram 200 of an embodiment that analyses the behaviour of the aquatic animals and the derives the appropriate feed amounts and rates which may be communicated to the farmer via a user interface 212 or automatically implemented where remote control of the food supply is available. Video streams (using RSTP) 204 may be obtained and input into a computer vision module 208 which processes and analyses the behaviour of the aquatic animals. FIG. 2 further shows outputs from environmental sensors (Sensors Weather in the figure) applied to a sensor API 202 which is in turn provided to one or more learned decision making models 210 which is shown as f(x) as an example.

Further inputs may be derived from video feeds via an optional "switcher", as shown as 206 in FIG. 2, and two forms of video analysis to determine Pellet Detection and Activity. Further analysis of the video data may additionally be performed as discussed in more detail below. The purpose of the "switcher" 206 is select which video feeds to analyse at a particular time. It is possible for the switcher 206 to select all farm videos from all farm video feeds at a particular time. This switcher 206 implements a pool of threads to convert streaming protocol iframes to input frames for processing by converting the video feed from its native format into a sequence of images. The output of the function F(x) 210 is a feed recommendation to the farmer via a user interface 212. Thus the switcher 206 is only required for video streams from which frame-by-frame data isn't able to be extracted for input into the computer vision module 208. In some embodiments the computer vision module 208 is trained to take as direct input, without needing a switcher 206, the video streams of some or all formats.

FIG. 3 shows a more detailed view of the performance of the one or more learned functions. A number of inputs 302 are provided into the pre-processing module 304 including any or all of Activity, Pellets, Environment, Sensor and Auxiliary Data. These inputs 302 are inputted to one or more pre-processing modules 304 which may include Growth models, Biological models and Time Series Analysis. In the embodiment shown in FIG. 2, the preprocessing module includes the switcher 206 and the computer vision module 208 for example. The one or more learned model(s) 306 may comprise models arranged to provide an output 308 such as to: derive the amount of food required; estimate growth of the fish from temperature, dissolved oxygen, fish size, and/or fish age; calculate the time before harvest; and/or calculate required treatment levels.

Figure 3A:
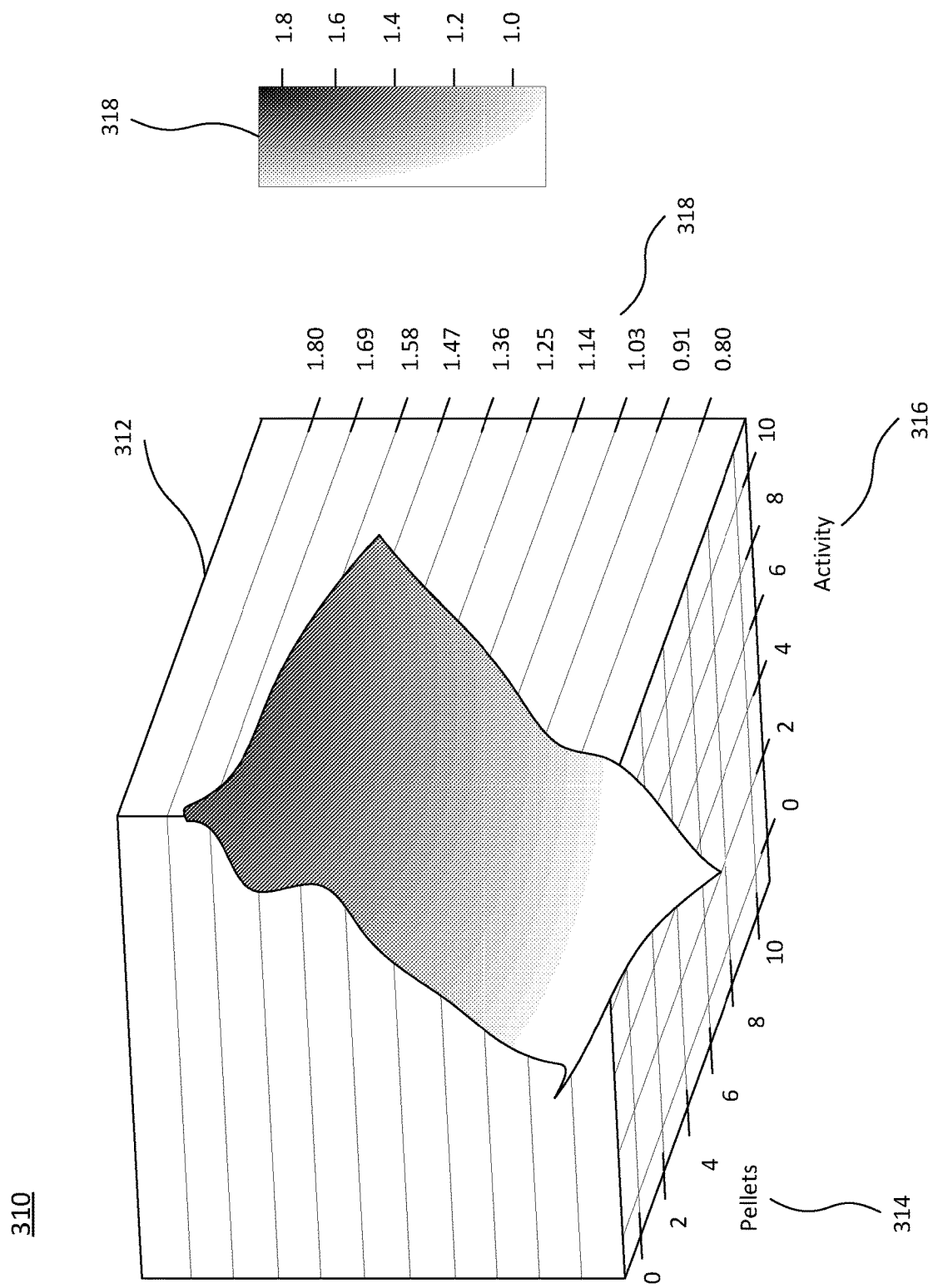
FIG. 3a shows a three-dimensional graph including an unscaled feed intensity score index.

FIG. 3a shows a three-dimensional graph including an unscaled feed intensity score index 318. In an example embodiment, a heat map 312 may be generated displaying a three-dimensional graph of feed pellets 314, aquatic animal activity 316 against an intensity score 318. In further embodiments this user interface may be provided in the form of one or more probability maps/heat maps/motion maps relating to feed and waste individually or together. Heat map vectors that mimic optical flow produces temporal data which can enhance the system's ability to classify objects based on how different objects fall within the cage.

Figure 3B:
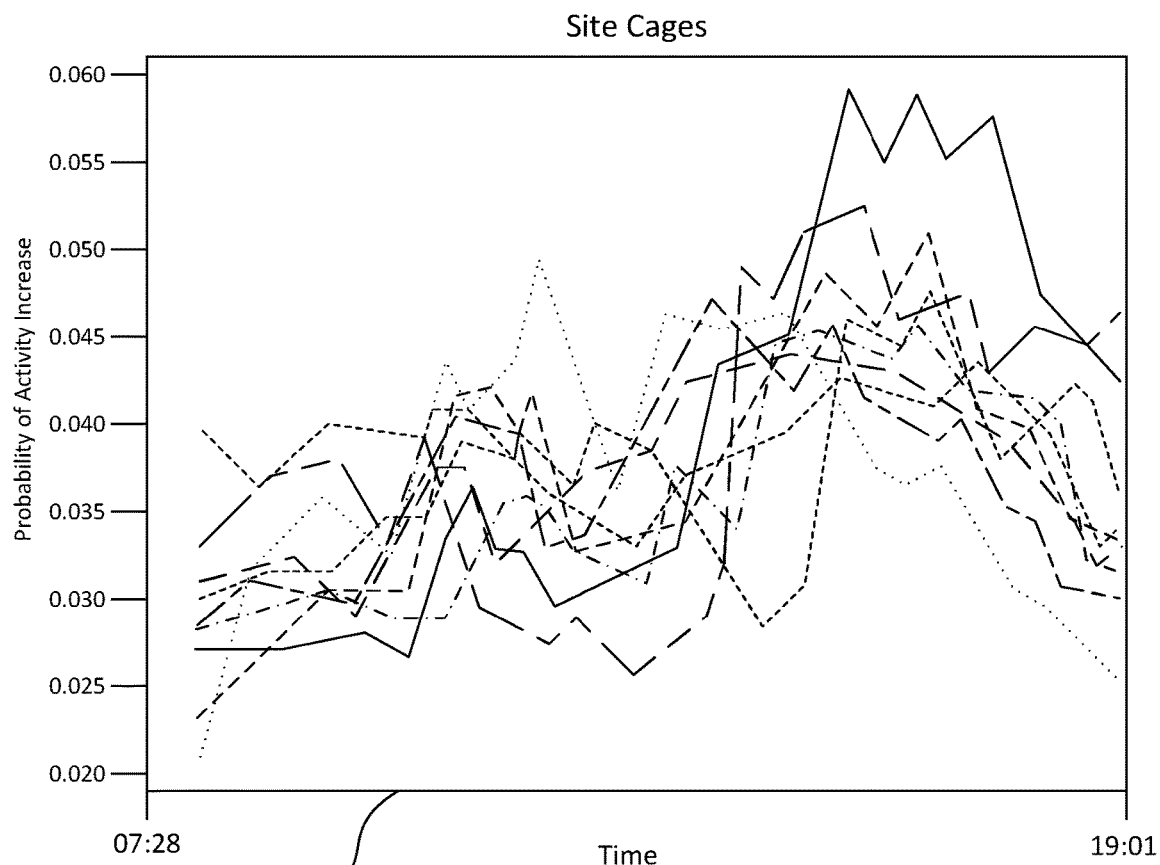
FIG. 3b shows a representation of fish trends over a period of time.
Figure 3C:
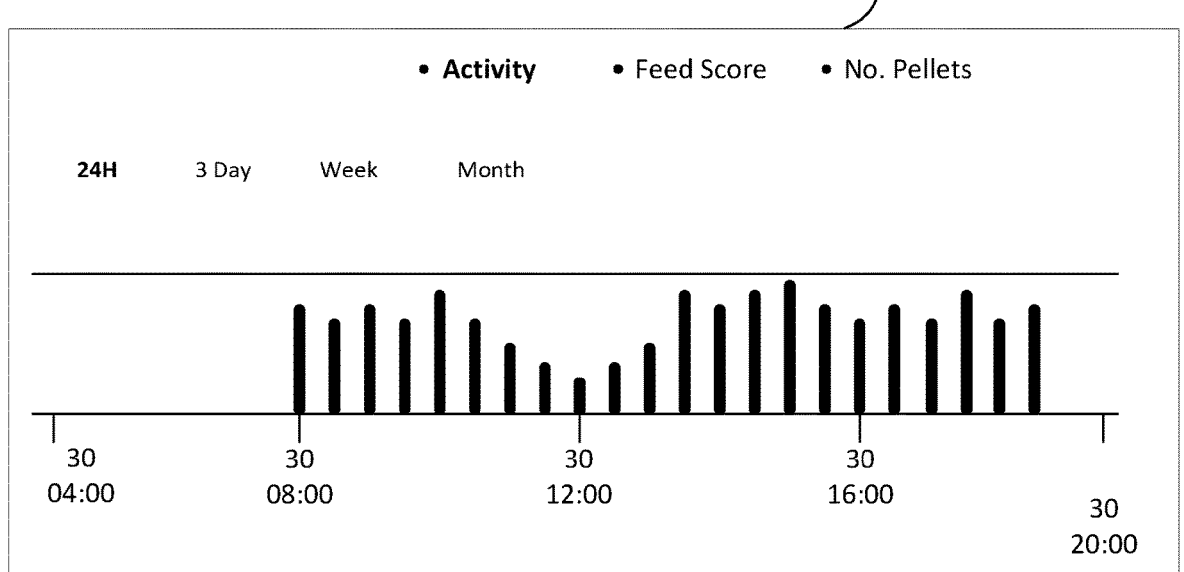

FIGS. 3b and 3c show representations of fish trends over a period of time. For example, in the immediate term, output from one or more learned functions may determine a Feed/activity Intensity Index Score represented as a graph of activity/pellets against time 322 as shown in FIG. 3b; and a bar graph displaying activity/pellets against intensity 324 for site cages as shown in FIG. 3c can be used to assist and/or instruct the farmer in feeding the aquatic animals. In the longer term, farmer feedback can be used together with a simple linear regression analysis to derive improvements to the Learned model 306.

One goal of one of more of the embodiments described might be to substantially optimise the growth rate of the fish in a farm in relation to the FCR using computer vision and correlations as part of the learned decision making model(s) regarding environmental data.

A fully convolutional system also allows the one or more trained neural networks to learn the behaviour of fish relative to objects around them whilst classifying these objects.

A unified neural network model may be implemented where all activities are added as input. This unified model merges all computer vision processes for calculating pellets, waste, and activity of the fish in one deep learning graph and allows for faster systems which are capable of sharing learned features compared to separate model/trained network for each process. Extra information can be obtained by merging multiple activity and pellet models into one graph, for example, as by knowing the relative factors for activity, for example fish speed, schooling behaviour, movement and distance from camera, pellets and waste can be better localised and classified.

Through multi-task learning, the one or more trained neural networks may be capable of learning pellet/waste and activity data simultaneously and understanding how different activities affect the classification of feed/waste and vice versa. The implementation of multi-task learning may allow for motion estimation and classification of feed pellets/feed waste with global characteristic regressions such as activity and bad activity.

Figure 7:
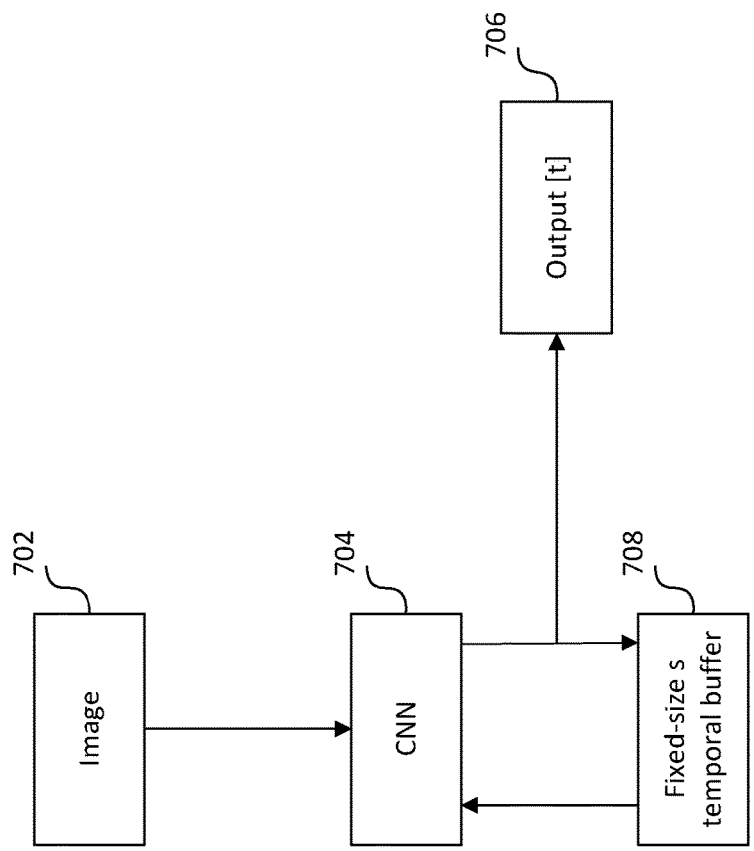
FIG. 7 shows an overview of an example "buffered" recurrent CNN.

FIG. 7, 700, shows an overview of a "buffered" recurrent CNN. In an example embodiment, an image(s) 702 is input into a convolutional neural network 704. This overview takes into account two outputs, "external" and "hidden". "External outputs" 706 may include 2D class probability heatmaps, 2D motion heatmaps and scalar attributes such as activity or bad activity of fish. "Hidden outputs" 708 may comprise a tracking features tensor and an activity features tensor and in this example is stored in a fixed size temporal buffer such as a FIFO buffer.

Figure 8:
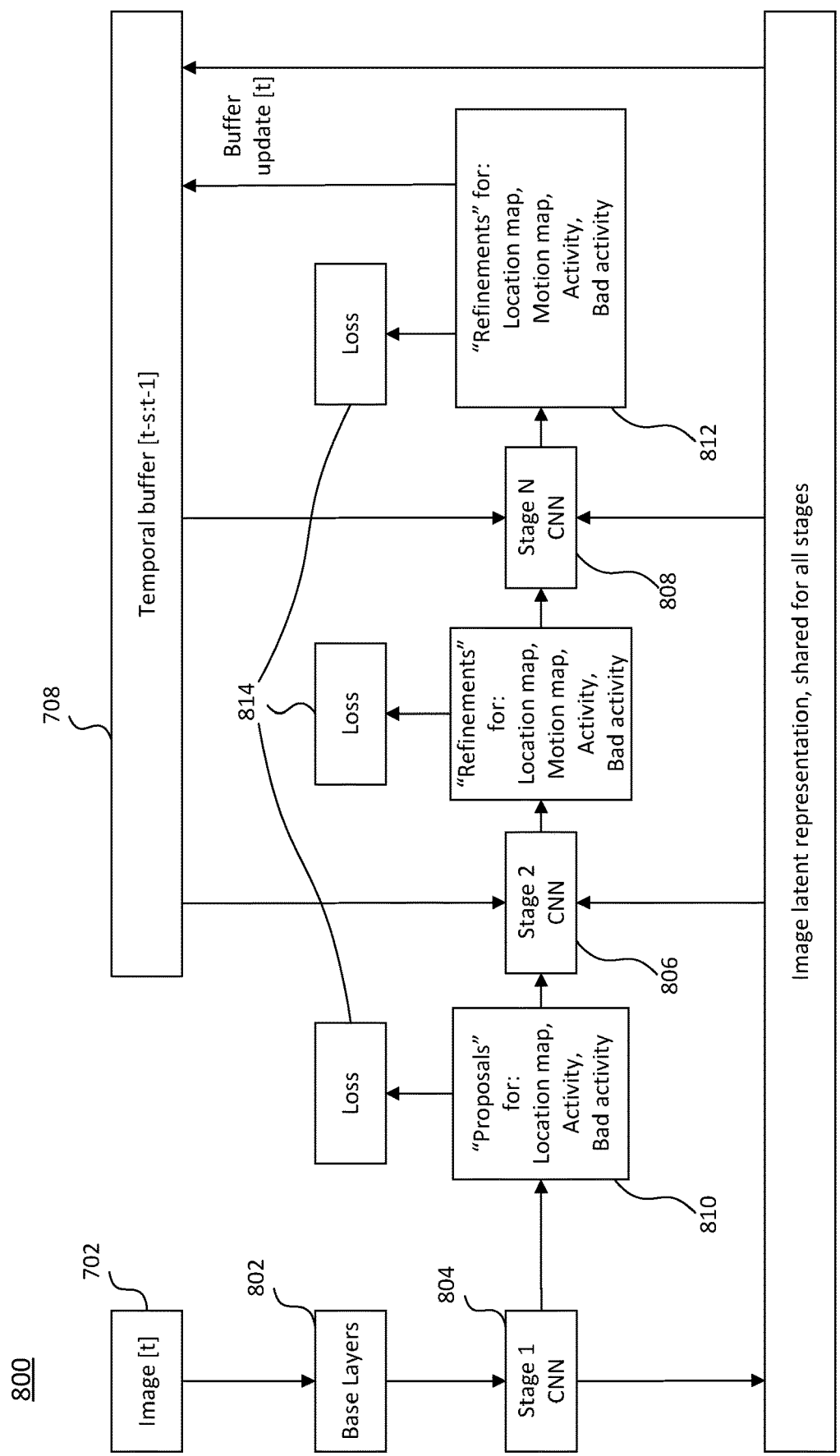
FIG. 8 shows a more detailed view of the "buffered" recurrent CNN as shown in FIG. 7.

FIG. 8, 800, shows a more detailed view of the "buffered" recurrent CNN. The base layers 802 serves to compute and process main image features. Various stages may be present in such CNNs. For example, stage one 804 may look to compute preliminary predictions, or a "proposal" 810, based on the external output features 706 and all stages following the initial prediction stage, stage two 806 through to stage N 808, may seek to make refinements 812 to each stage prediction/proposal in stages N−1 using additional information stored within the temporal buffer 708.

Training such CNNs may include additional tasks to be carried out by the system in order to substantially optimise the prediction and refinements stages. In an example, training may constitute of analysing outputs simultaneously in a multi-tasking fashion for various objectives and may further determine the loss 814 for each of the outputs taken into account by the CNN at each of the prediction and refinement stages.

In some embodiments, feed history, past feed conversion rates, biomass of fish and other data may be taken into consideration in training neural networks.

In addition to feeding, some embodiments determine the health of the fish and their environment. One example is monitoring of the visibility in the cage. Poor visibility is likely to be due to algal blooms which can arise very quickly and result in the death of fish stocks. In 2016, for example, 27 million fish were killed in Chile by algal blooms costing the industry around 800 million USD. Visibility would generally be monitored using signals from a camera commanding a wide-angle view (coarse data) of the cage.

Determining the number of deceased aquatic animals, however, will generally be conducted by performing an analysis of a finer view of the cage. This could be conducted using a portion of an image from a high-resolution camera or from a zoomed-in PTZ camera. Deceased aquatic animals will typically be detected in a "sock" at the bottom of the cage which dead fish "roll" into.

FIG. 4 shows a user interface 400 illustrating feed waste detection alongside fish activity data. In an example user interface, there may be shown a view of a cage 402, the status of that particular cage 404 and a time-based graph in relation to intensity of activity within and/or feed pellet detections within the cage 406. The user interface 400 may provide a particular cage ID, current time and an estimate of the level of activity regarding the visual real time image of a cage in view along with a view of the cage overlaid with segmentation data in relation to detected objects. The user interface may be further capable of indicating the classification of detected/segmented objects, such as to distinguish pellets, aquatic animals, wasted feed pellets and other waste. The user interface 400 may also be capable of providing information, whether textually, visually or graphically, information about the cage being viewed such as environment visibility, presence of unwanted aquatic animals, infrastructure, stock and the number of deceased aquatic animals.

Figure 5:
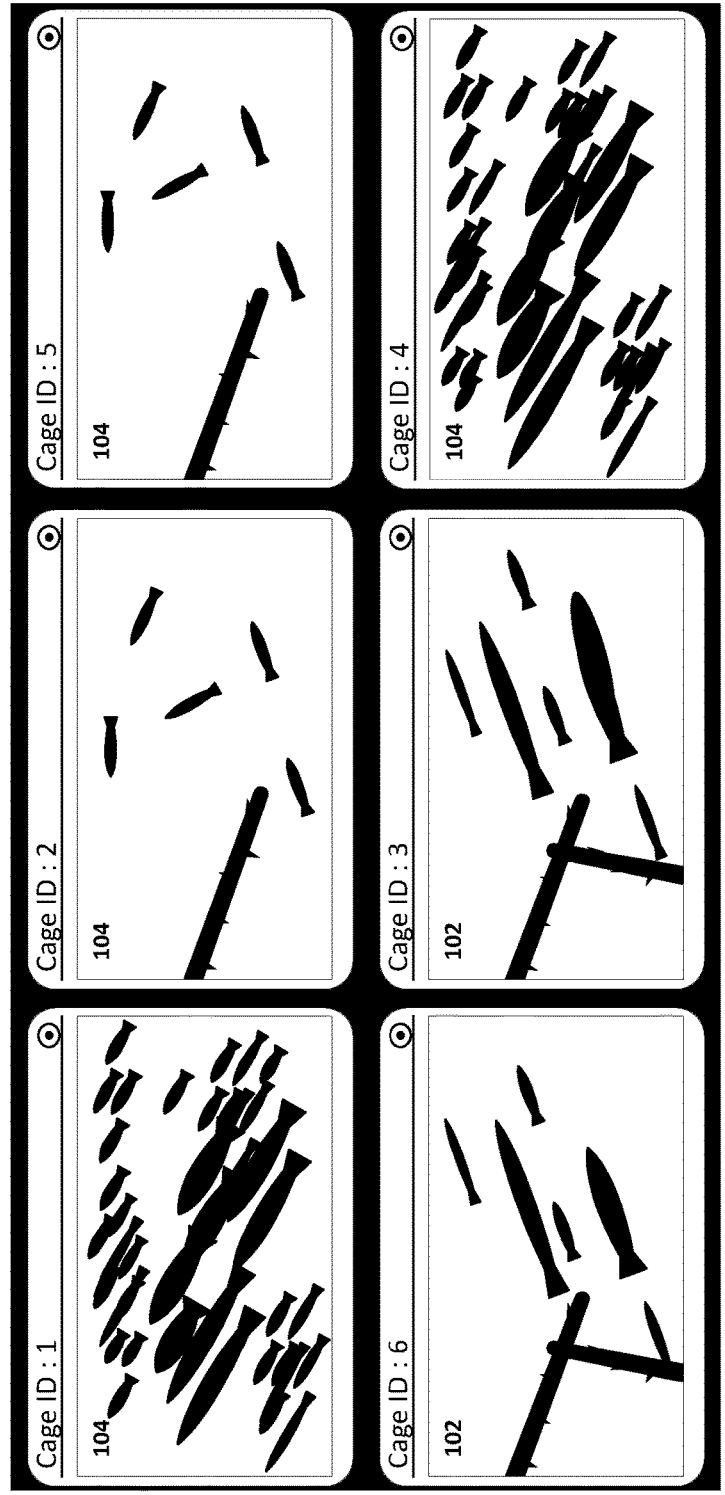
FIG. 5 shows a further example of a user interface.

FIG. 5 shows a further example of a user interface 500 which provides a view from six separate image sensors. Depending on available hardware, the or more image outputs may be viewed for the same cage depending on user preference and/or requirement.

Another task that is conducted using a fine, or zoomed in, view of the cage is determining the state of the net defining the boundary of the cage. A dirty net can impede the tidal flow in and out of the cage which has a negative impact on the dissolved oxygen levels in the cage. This task may be extended to also detect jellyfish on the netting which are also capable of reducing the tidal flow.

The output of the neural network for detecting the pellets is, in some embodiments, also provided as an input to one or more decision making models. In some embodiments, the output data can be used by reinforcement learning algorithms in order to evaluate and determine how to optimise feeding farms or individual cages.

Figure 6:
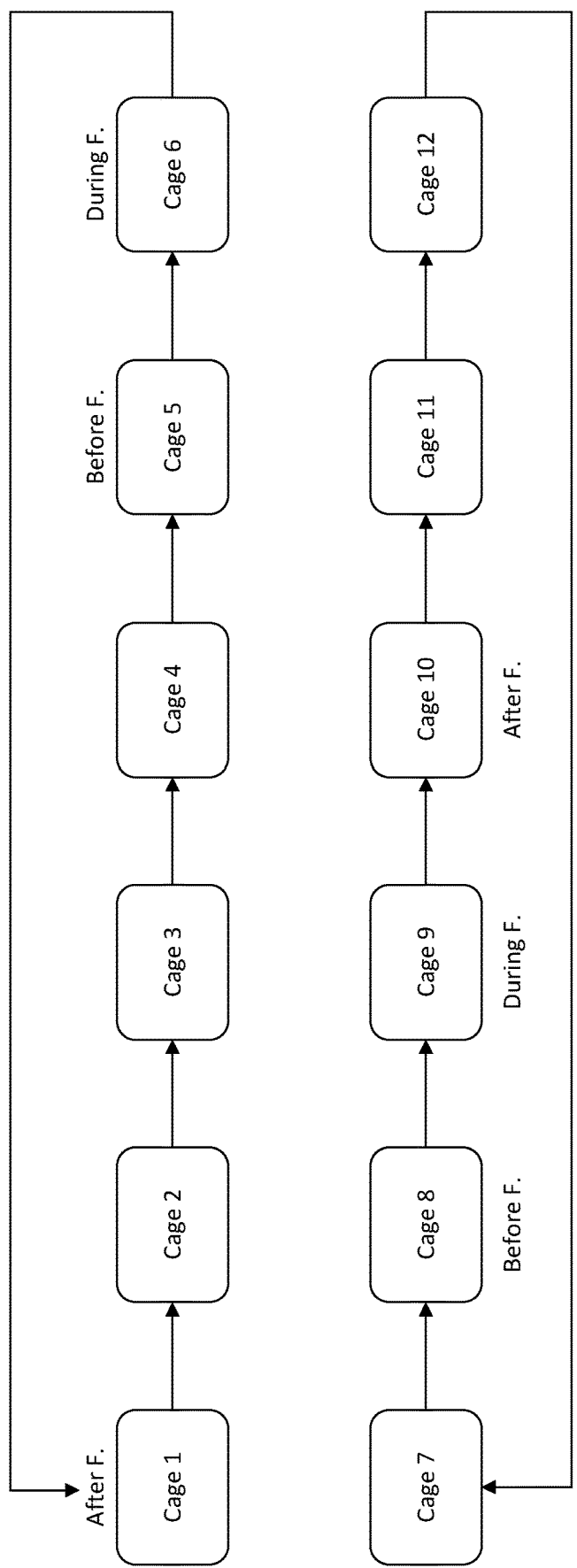
FIG. 6 illustrates a timing of processing performed for a number of cages in sequence.

FIG. 6 600 shows a diagram illustrating the processing of a 12-cage fish farm. The top half of the diagram shows cages 1 to 6 and shows the steps taken during the feeding of aquatic animals in cage 6 while the bottom half of the diagram shows cages 7 to 12 and shows the steps of feeding aquatic animals located in cage 9. There are three steps for each cage. Namely, (1) determining the activity of the aquatic animals pre-feeding, (2) determining the activity of the aquatic animals during feeding and (3) measuring satiety of the aquatic animals post-feeding. Pre-feeding analysis may also be performed during the feeding analysis stage, which may provide a greater understanding of how the fish are reacting to feed in the water and hence provide a more accurate recommendation for that particular cage. The first step for cage 6 is conducted while cage 5 is in the feeding step. The feeding step for cage 6 is performed during the post-feeding step for cage 5. The post-feeding step for cage 6 is performed during the pre-feeding step of cage 1 and so on. By arranging the processing in this pipelined manner, effective processing may be achieved with the minimum amount of processing hardware. Such processing may take place using a Long Short Term Memory (LSTM) neural network. Activity may also be analysed during feeding, and through one or more learned functions may be weighted more/less heavily to provide a more accurate Learned model. Activity monitoring may be undertaken at any time before, during and/or after feeding occurs. An entire site may be monitored at the same time.

In addition, processing may be prioritised by giving higher priority, and processing more urgently, the processing of video feeds from higher priority cages (rather than processing all cages in order of receipt of the video feed data).

The operator user interface may display a range of relevant information, for example but not limited to: details regarding the wellness of the fish, the number of different species of aquatic life detected, the cleanliness of the fish farm environment, and the status of any nets or barriers used to protect and/or separate the fish being farmed.

While embodiments have been described using fixed cameras (with a constant view or PTZ) specific sensing tasks may be more effectively carried out by cameras mounted on robotic operated vehicles. One such task is checking the condition of the nets.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

Although this invention is focused on open sea cages, activity and feed factors may be also analysed in indoor fish farms. However, in indoor fish farms, one or more variables may be controllable, e.g. oxygen level, lighting, and/or temperature.

The invention claimed is:

1. A computer-implemented method for detecting motion in relation to one or more aquatic animals, the method comprising:
   receiving sensor data;
   determining from the sensor data one or more moving objects using one or more learned functions, wherein the one or more learned functions comprise one or more neural networks, wherein the one or more neural networks perform a task of defining images obtained through real time image analysis of the sensor data as either feed or not feed, and wherein the one or more neural networks comprise one or more feedback loops; and
   generating output data in relation to the determined one or more moving objects, wherein the output data is based on temporal information provided by the one or more feedback loops.

2. The method of claim 1, wherein said one or more moving objects comprises any or any combination of: feed; feed pellets; faeces; aquatic animals; groups of aquatic animals.

3. The method of claim 1, wherein the sensor data is obtained from one or more enclosed spaces containing water; optionally wherein the one or more enclosed spaces comprise one or more cages and/or one or more aquatic animal farms.

4. The method of claim 1, wherein the sensor data comprises any or any combination of: image data; a plurality of image frames; video data; acoustic data; sonar data; light data; biomass data; environmental data; stereo vision data; acoustic camera data; and/or fish activity data:
   optionally wherein said sensor data comprises any or a combination of: fish type; feed type; past and present feed conversion ratio; biological feed conversion ratio; economical feed conversion ratio; past and present standard growth rate; past and present specific growth rate; mortality data; feed input data comprising amount and/or rate and/or intensity; and/or
   optionally wherein said fish activity data comprises any or a combination of: reaction of fish towards feed; fish schooling data; surface feeding activity; fish density; fish speed; sound of fish eating; sound of fish moving; and/or distance of fish from sensors; and/or
   optionally wherein said environmental data comprises any or a combination of: dissolved oxygen level; state of the tide; pH of the water; visibility through the water; intensity of light incident on the water; biomass data; mass of feed being consumed; air and/or water temperature; sunlight; cleanliness of water; salinity; saturation; rainfall; tide level; state of nets; treatments; sea lice count; oxygen input data; current or wind data; fish genetic data; and/or fish vaccination.

5. The method of claim 1, wherein the one or more neural networks comprise any or a combination of: one or more trained neural networks; one or more convolutional neural networks (CNNs); one or more deep learning functions and/or models; one or more CNNS comprising one or more architectural models such as ResNet, InseptionNet and/or SqueezeNet; Long Short Term Memory (LSTM) neural networks; Recurrent neural networks (RNN); and/or Gated Recurrent Unit (GRU);
   optionally wherein the sensor data is an input into said one or more neural networks; and/or
   optionally wherein the one or more neural networks are updated over a time period and/or using reinforcement learning techniques and/or are arranged to continuously learn in real time.

6. The method of claim 5, wherein motion of the one or more moving objects is monitored over all or a sequential portion of said sensor data;
   optionally wherein any localization and/or tracking of the aquatic animals is performed through the use of one or more CNNs; and/or
   optionally wherein an activity level is monitored over a plurality of individual image frames.

7. The method of claim 1, wherein an activity level of one or more aquatic animals is determined by the one or more neural networks;
   optionally wherein the sensor data is labelled to extract features which optimise feeding; and/or
   optionally wherein the activity level is labelled within a range between low to high; and/or optionally wherein the activity level of one or more aquatic animals comprises speed, schooling behaviour, movement and/or distance from a sensor.

8. The method of claim 1, wherein feeding data is determined by the one or more neural networks;
   optionally wherein the feeding data comprises any or any combination of: detected feed pellets; wasted feed pellets; faeces; and/or determining the one or more moving objects comprises distinguishing between feed and waste; and/or
   determining the one or more moving objects comprises feed pellets at a depth below that at which the one or more aquatic animals normally feed; and/or
   optionally wherein feeding data comprises a determination of a proportion of the feed not consumed by the animals by distinguishing between feed pellets and waste products of the animals in the sensor data.

9. The method of claim 1, wherein data regarding the one or more aquatic animals is determined; said data comprising one or more of: feeding pellets not consumed; feed conversion rate; biomass; animal mortality; animal growth; instructing placement of a derived amount of feed; and/or animal activity; optionally wherein in response to determining said data of the method includes triggering an alarm in response to any or any combination of: overfeeding, underfeeding, detected levels of dissolved oxygen dropping, the presence of other species of animal in the enclosed space, detected health anomalies, and/or detected net holes.

10. The method of claim 1, wherein the output in relation to the determined one or more moving objects is generated through correlation analysis of the sensor data comprising one or more analysis in relation to any or any combination of: feed provided to the one or more aquatic animals; activity level of the one or more aquatic animals; wasted feed pellets; and/or environmental data.

11. The method of claim 10, wherein the correlation analysis is performed using the one or more feedback loops; optionally wherein the one or more feedback loops comprises a circular buffer and/or a state buffer.

12. The method of claim 11, wherein an optimised level of feed is determined by using the one or more feedback loops optimising for one or more variables; optionally wherein the one or more variables comprises any one or more of growth rate to feed conversion ratio, minimal pellet loss, and/or sea lice.

13. The method of claim 10, wherein determining the one or more features of the system comprises correlating one or more signals to the one or more features;
optionally wherein the step of correlating the one or more signals to the one or more features comprises multi-task learning; and/or
further optionally wherein the step of correlating the one or more signals to the one or more features comprises converging the one or more signals to the one or more features.

14. The method of claim 13, wherein the optimised level of feed is generated through the use of the one or more neural networks to form a model;
optionally wherein the one or more neural networks comprise one or more convolutional neural networks (CNNs); and/or
optionally wherein the model is trained and formed to: analyse real time image data to perform feed detection and localisation; analyse previous image frames to identify movement and/or warping of pellets relative to current real time image data frames; and enhance the distinction of feed and waste for future image frames; and/or
further optionally wherein localization is performed using one or more blob detectors; and/or
still further optionally wherein the one or more neural networks uses the one or more feedback loops to provide the temporal information: optionally wherein the one or more neural networks comprises any of: Long Short Term Memory (LSTM) neural networks; Recurrent neural networks (RNN); Gated Recurrent Unit (GRU); internal state machines; and/or circular buffers; and/or
further optionally wherein the one or more neural networks is used to create a feature set from the sensor data by correlating two or more feature signals obtained from the sensor data; and/or
further optionally the method comprising determining, from a portion of stored data, at least one new parameter for deriving the amount of feed using a deep learning (DL) algorithm; and/or
further optionally wherein the model is arranged to continuously learn in real time.

15. The method of claim 1, wherein the sensor data comprises a plurality of substantially real time sensor data streams that are received individually and/or simultaneously;
optionally wherein the plurality of substantially real time sensor data streams are learned simultaneously using multi-task learning; and/or
further optionally wherein the multi-task learning is implemented for simultaneous detection, motion estimation, feed/waste classification, characteristic regressions, and/or bounding box regression; and/or
further optionally wherein the plurality of real time sensor data streams are mapped in real time.

16. The method of claim 1, wherein the sensor data is mapped on any one or more of: probability maps; heat maps; motion maps; flow maps; and/or unified maps; optionally wherein the sensor data is mapped in relation to feed and/or waste, and/or further optionally wherein the sensor data is mapped as an optical flow.

17. The method of claim 1, further comprising determining feed to be provided to the one or more aquatic animals; optionally wherein determining feed comprises any one or more of: determining whether to increase/decrease the amount of feed; determining whether to continue/cease feeding; determining an area feed is to be provided; and/or determining whether to start/stop providing feed to the one or more aquatic animals.

18. The method of claim 1, wherein the output data in relation to the determined one or more moving objects is provided to one or more learned decision-making models.

19. The method of claim 1, further comprising:
receiving first real time image data from the confined space during a first time period;
determining, from at least the real time image data, an activity level for the animals prior to and/or during feeding;
deriving an amount of feed required in response, at least to the activity level;
instructing placement of the derived amount and rate of feed in the confined space;
receiving second real time image data from the confined space during a second time period;
determining, from at least the second real time image data, what proportion of the feed is not consumed by the animals and/or an activity response of the animals to the feed;
receiving third real time image data from the enclosed space during a third time period;
calculating a degree of satiety of the animals from at least the third real time image data; and
storing at least a portion of the data in respect of at least one of the time periods.

20. The method of claim 1, further comprising:
showing data regarding the animals to an operator via a user interface; and/or instructing placement of the derived amount of feed comprises signalling to feed distribution apparatus.

21. The method of claim 20, wherein the data regarding the animals includes data relating to one or more of: feeding pellets not consumed, animal mortality, instructing placement of the derived amount of feed, and/or animal activity.

22. The method of claim 20, wherein the data regarding the animals is transmitted to an operator via the Internet.

23. The method of claim 1, wherein the sensor data includes video data that is provided by a pan-tilt-zoom camera and the method further comprises adjusting the camera prior to at least one of the steps of receiving video data.

24. The method of claim 1, further comprising:
triggering an alarm in response to at least one of: overfeeding, underfeeding, detected levels of dissolved oxygen dropping, and/or the presence of other species of animal in the confined space.

25. The method of claim 1, wherein the sensor data includes a signal from at least one video sensor, the method comprising processing video data from the at least one video sensor, the video data capturing at least two distinct confined spaces, wherein the video data from the at least two distinct confined spaces is processed in parallel.

\* \* \* \* \*